(12) United States Patent
Feldman et al.

(10) Patent No.: US 7,727,117 B2
(45) Date of Patent: Jun. 1, 2010

(54) METHOD AND APPARATUS FOR OPERATIVELY CONTROLLING A VIRTUAL REALITY SCENARIO WITH A PHYSICALLY DEMANDING INTERFACE

(75) Inventors: Philip Feldman, Catonsville, MD (US); Greg Merril, Bethesda, MD (US)

(73) Assignee: IALabs-CA, LLC, Potomac, MD (US)

( * ) Notice: Subject to any disclaimer, the term of this patent is extended or adjusted under 35 U.S.C. 154(b) by 1065 days.

(21) Appl. No.: 11/372,231

(22) Filed: Mar. 10, 2006

(65) Prior Publication Data
US 2006/0205565 A1 Sep. 14, 2006

Related U.S. Application Data

(63) Continuation-in-part of application No. 10/975,185, filed on Oct. 28, 2004, now abandoned, which is a continuation-in-part of application No. 10/806,280, filed on Mar. 23, 2004, now abandoned, which is a continuation-in-part of application No. 10/309,565, filed on Dec. 4, 2002, now Pat. No. 7,121,982.

(60) Provisional application No. 60/514,897, filed on Oct. 29, 2003, provisional application No. 60/739,915, filed on Nov. 28, 2005.

(51) Int. Cl.
*A63B 71/00* (2006.01)
(52) U.S. Cl. .............. 482/8; 482/1; 482/9; 482/902
(58) Field of Classification Search ............ 482/1–9, 482/900–902; 434/29, 247
See application file for complete search history.

(56) References Cited

U.S. PATENT DOCUMENTS

| 2,715,007 | A | 8/1955 | Zeitlin |
| D188,376 | S | 7/1960 | Hotkins et al. |

(Continued)

FOREIGN PATENT DOCUMENTS

DE 19900442 A1 7/2000

(Continued)

OTHER PUBLICATIONS

"Wii Fit", Wikipedia, http://en.wikipedia.org/wiki/Wii_Fit, retrieved from Internet Aug. 27, 2007.

(Continued)

*Primary Examiner*—Glenn Richman
(74) *Attorney, Agent, or Firm*—Edell, Shapiro & Finnan, LLC

(57) ABSTRACT

A safe, physically demanding interface device for children or other users to play video games according to the present invention includes a base and a joystick or control rod. The base supports a significant portion or the entirety of the child weight (e.g., supports a child in a seated or standing position), while the joystick is manipulable by the child to play the games. The device is configured to force the child to utilize many of the large muscle groups to interact with the game. Since the child weight is supported by the base, the interface device is stable (e.g., unlikely to tip or move) and, therefore, provides for safe, compelling video game play for users either alone or with other users.

44 Claims, 16 Drawing Sheets

U.S. PATENT DOCUMENTS

| | | |
|---|---|---|
| 3,170,687 A | 2/1965 | Lugger |
| 3,428,312 A | 2/1969 | Machen |
| 3,873,087 A | 3/1975 | Burkart et al. |
| 4,026,279 A | 5/1977 | Simjian |
| 4,296,931 A | 10/1981 | Yokoi |
| 4,337,050 A | 6/1982 | Engalitcheff, Jr. |
| 4,420,808 A | 12/1983 | Diamond et al. |
| 4,494,754 A | 1/1985 | Wagner, Jr. |
| 4,588,054 A | 5/1986 | LeBaron |
| 4,630,817 A | 12/1986 | Buckley |
| 4,660,828 A | 4/1987 | Weiss |
| 4,680,577 A | 7/1987 | Straayer et al. |
| 4,691,694 A | 9/1987 | Boyd et al. |
| 4,711,447 A | 12/1987 | Mansfield |
| 4,742,832 A | 5/1988 | Kauffmann et al. |
| 4,855,704 A | 8/1989 | Betz |
| 4,890,495 A | 1/1990 | Slane |
| 4,938,474 A | 7/1990 | Sweeney et al. |
| 4,949,993 A | 8/1990 | Stark et al. |
| D318,073 S | 7/1991 | Jang |
| 5,054,771 A | 10/1991 | Mansfield |
| 5,060,932 A | 10/1991 | Yamaguchi |
| 5,089,960 A | 2/1992 | Sweeney, Jr. |
| 5,104,119 A | 4/1992 | Lynch |
| 5,116,296 A | 5/1992 | Watkins et al. |
| 5,118,094 A | 6/1992 | Lambert |
| 5,151,071 A | 9/1992 | Jain et al. |
| 5,195,746 A | 3/1993 | Boyd et al. |
| 5,199,875 A | 4/1993 | Trumbull |
| 5,299,810 A | 4/1994 | Pierce et al. |
| 5,312,315 A * | 5/1994 | Mortensen et al. .......... 482/113 |
| 5,318,491 A | 6/1994 | Houston |
| 5,353,242 A | 10/1994 | Crosbie et al. |
| 5,360,383 A | 11/1994 | Boren |
| 5,362,298 A | 11/1994 | Brown et al. |
| 5,368,546 A | 11/1994 | Stark et al. |
| 5,431,569 A | 7/1995 | Simpkins et al. |
| 5,437,453 A | 8/1995 | Hineman |
| 5,462,503 A | 10/1995 | Benjamin et al. |
| 5,466,200 A | 11/1995 | Ulrich et al. |
| 5,515,078 A | 5/1996 | Greschler et al. |
| 5,547,439 A | 8/1996 | Rawls et al. |
| 5,551,693 A | 9/1996 | Goto et al. |
| 5,551,920 A | 9/1996 | Ogden et al. |
| 5,562,572 A | 10/1996 | Carmein |
| D376,826 S | 12/1996 | Ashida |
| 5,584,700 A | 12/1996 | Feldman et al. |
| 5,591,104 A | 1/1997 | Andrus et al. |
| 5,610,631 A * | 3/1997 | Bouton et al. ............... 345/161 |
| 5,618,251 A | 4/1997 | Sullivan |
| 5,642,496 A | 6/1997 | Kanfi |
| 5,643,146 A | 7/1997 | Stark et al. |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,713,794 A | 2/1998 | Shimojima et al. |
| 5,716,274 A | 2/1998 | Goto et al. |
| 5,721,566 A | 2/1998 | Rosenberg et al. |
| 5,782,639 A * | 7/1998 | Beal ............................ 434/29 |
| 5,785,630 A | 7/1998 | Bobick et al. |
| D397,164 S | 8/1998 | Goto |
| 5,792,031 A | 8/1998 | Alton |
| 5,805,138 A | 9/1998 | Brawne et al. |
| 5,813,958 A | 9/1998 | Tomita |
| 5,829,982 A | 11/1998 | Advani et al. |
| D402,317 S | 12/1998 | Goto |
| 5,853,326 A | 12/1998 | Goto et al. |
| 5,854,622 A | 12/1998 | Brannon |
| 5,889,507 A | 3/1999 | Engle et al. |
| D407,758 S | 4/1999 | Isetani et al. |
| 5,890,995 A | 4/1999 | Bobick et al. |
| 5,897,469 A | 4/1999 | Yalch |
| 5,901,612 A | 5/1999 | Letovsky |
| 5,904,639 A | 5/1999 | Smyser et al. |
| D411,258 S | 6/1999 | Isetani et al. |
| 5,921,899 A | 7/1999 | Rose |
| 5,929,782 A | 7/1999 | Stark et al. |
| 5,947,824 A | 9/1999 | Minami et al. |
| 5,973,679 A | 10/1999 | Abbott et al. |
| 5,980,256 A | 11/1999 | Carmein |
| 5,989,157 A | 11/1999 | Walton |
| D421,070 S | 2/2000 | Jang et al. |
| 6,037,927 A | 3/2000 | Rosenberg |
| 6,038,940 A | 3/2000 | Rosheim |
| 6,044,772 A | 4/2000 | Gaudette et al. |
| 6,050,822 A | 4/2000 | Faughn |
| 6,086,518 A | 7/2000 | MacCready, Jr. |
| 6,102,832 A | 8/2000 | Tani |
| 6,106,301 A | 8/2000 | Merril |
| D431,050 S | 9/2000 | Collins |
| 6,123,647 A | 9/2000 | Mitchell |
| 6,147,674 A | 11/2000 | Rosenberg et al. |
| 6,152,854 A | 11/2000 | Carmein |
| D434,769 S | 12/2000 | Goto |
| D434,770 S | 12/2000 | Goto |
| 6,203,432 B1 | 3/2001 | Roberts et al. |
| 6,210,286 B1 | 4/2001 | Ohara et al. |
| 6,216,547 B1 | 4/2001 | Lehtovaara |
| D441,369 S | 5/2001 | Goto |
| 6,228,000 B1 | 5/2001 | Jones |
| 6,231,444 B1 | 5/2001 | Goto et al. |
| 6,244,988 B1 | 6/2001 | Delman |
| D444,469 S | 7/2001 | Goto |
| 6,296,595 B1 | 10/2001 | Stark et al. |
| 6,325,767 B1 | 12/2001 | Wolff et al. |
| 6,330,837 B1 | 12/2001 | Charles et al. |
| 6,353,427 B1 | 3/2002 | Rosenberg |
| 6,355,048 B1 | 3/2002 | Hong et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,388,655 B1 | 5/2002 | Leung |
| 6,394,905 B1 | 5/2002 | Takeda et al. |
| 6,406,408 B1 | 6/2002 | Price, II |
| D459,727 S | 7/2002 | Ashida |
| D460,506 S | 7/2002 | Tamminga et al. |
| D462,683 S | 9/2002 | Ashida |
| 6,482,010 B1 | 11/2002 | Marcus et al. |
| 6,514,145 B1 | 2/2003 | Kawabata et al. |
| D471,594 S | 3/2003 | Nojo |
| 6,547,702 B1 | 4/2003 | Heidecke |
| 6,563,487 B2 | 5/2003 | Martin et al. |
| 6,568,334 B1 | 5/2003 | Gaudette et al. |
| 6,612,170 B2 | 9/2003 | Brown |
| 6,616,579 B1 | 9/2003 | Reinbold et al. |
| 6,624,802 B1 | 9/2003 | Klein et al. |
| 6,636,161 B2 | 10/2003 | Rosenberg |
| 6,642,857 B1 | 11/2003 | Schediwy et al. |
| 6,663,058 B1 | 12/2003 | Peterson et al. |
| 6,676,569 B1 | 1/2004 | Radow |
| 6,693,622 B1 | 2/2004 | Shahoian et al. |
| 6,722,888 B1 | 4/2004 | Macri et al. |
| 6,726,566 B2 | 4/2004 | Komata |
| 6,733,293 B2 | 5/2004 | Baker et al. |
| 6,743,154 B2 | 6/2004 | Epstein |
| 6,770,040 B2 | 8/2004 | Perner et al. |
| 6,774,885 B1 | 8/2004 | Even-Zohar |
| D500,100 S | 12/2004 | van der Meer |
| 6,859,198 B2 | 2/2005 | Onodera et al. |
| 6,888,076 B2 | 5/2005 | Hetherington |
| 6,897,779 B2 | 5/2005 | Nishitani et al. |
| 6,902,513 B1 | 6/2005 | McClure |

| | | |
|---|---|---|
| D510,391 S | 10/2005 | Merril et al. |
| 6,975,302 B1 | 12/2005 | Ausbeck, Jr. |
| 6,991,483 B1 | 1/2006 | Milan et al. |
| D514,627 S | 2/2006 | Merril et al. |
| 6,994,627 B2 | 2/2006 | Menosky et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,039,866 B1 | 5/2006 | Rosenberg et al. |
| 7,083,546 B2 | 8/2006 | Zillig et al. |
| 7,121,982 B2 | 10/2006 | Feldman |
| 7,125,388 B1 | 10/2006 | Reinkensmeyer et al. |
| 7,139,983 B2 | 11/2006 | Kelts |
| 7,158,118 B2 | 1/2007 | Liberty |
| 7,160,233 B2 | 1/2007 | Perez |
| 7,198,590 B1 | 4/2007 | Nicholas |
| 7,262,760 B2 | 8/2007 | Liberty |
| 7,331,226 B2 | 2/2008 | Feldman et al. |
| 7,335,134 B1 | 2/2008 | LaVelle |
| 7,414,611 B2 | 8/2008 | Liberty |
| 7,530,929 B2 | 5/2009 | Feldman et al. |
| 2001/0018363 A1 | 8/2001 | Goto et al. |
| 2002/0022551 A1 | 2/2002 | Watterson et al. |
| 2002/0055424 A1 | 5/2002 | Brown |
| 2002/0080115 A1 | 6/2002 | Onodera et al. |
| 2002/0185041 A1 | 12/2002 | Herbst |
| 2003/0033885 A1 | 2/2003 | Knox et al. |
| 2003/0069108 A1 | 4/2003 | Kaiserman et al. |
| 2003/0119638 A1 | 6/2003 | Chan |
| 2003/0171190 A1 | 9/2003 | Rice |
| 2003/0193416 A1 | 10/2003 | Ogata et al. |
| 2003/0228902 A1 | 12/2003 | Walker et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0097336 A1 | 5/2004 | Chuang |
| 2004/0097337 A1 | 5/2004 | Chuang |
| 2004/0099513 A1 | 5/2004 | Hetherington |
| 2004/0110602 A1 | 6/2004 | Feldman |
| 2004/0180719 A1 | 9/2004 | Feldman et al. |
| 2004/0214639 A1 | 10/2004 | Makuta |
| 2004/0259688 A1 | 12/2004 | Stabile |
| 2005/0049116 A1 | 3/2005 | Huang |
| 2005/0070154 A1 | 3/2005 | Milan |
| 2005/0130742 A1 | 6/2005 | Feldman et al. |
| 2006/0046849 A1 | 3/2006 | Kovacs |
| 2006/0097453 A1 | 5/2006 | Feldman et al. |
| 2006/0111181 A1 | 5/2006 | Thorsen |
| 2006/0132433 A1 | 6/2006 | Kramer et al. |
| 2006/0139317 A1 | 6/2006 | Leu et al. |
| 2006/0190823 A1 | 8/2006 | Cunningham et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0260395 A1 | 11/2006 | Feldman et al. |
| 2007/0066394 A1 | 3/2007 | Ikeda et al. |
| 2007/0072680 A1 | 3/2007 | Ikeda |
| 2007/0155589 A1 | 7/2007 | Feldman et al. |
| 2007/0219050 A1 | 9/2007 | Merril |
| 2007/0298883 A1 | 12/2007 | Feldman et al. |
| 2008/0146336 A1 | 6/2008 | Feldman et al. |
| 2010/0004061 A1 | 1/2010 | Merril et al. |

FOREIGN PATENT DOCUMENTS

| | | |
|---|---|---|
| GB | 2038597 A | 7/1980 |
| JP | 9192261 | 7/1997 |
| JP | 9325674 | 12/1997 |
| JP | 11309270 | 9/1999 |
| JP | 2002095710 | 4/2002 |
| JP | 2002126019 | 5/2002 |
| WO | 9111221 | 8/1991 |
| WO | 0057387 A1 | 9/2000 |
| WO | 2007062237 A2 | 5/2007 |

OTHER PUBLICATIONS

"Nintendo E3 2007- Wii Fit", http://e3nin.nintendo.com/wii_fit.html, retrieved from Internet Aug. 27, 2007.

Justin McElroy, "WiiFit Gonna Make You Sweat- Joystiq", http://www.joystiq.com/2007/07/11/wiifit-gonna-make-you-sweat/, Jul. 11, 2007.

Tom Dang et al., "Interactive Video Exercise System for Pediatric Brain Injury Rehabilitation," Proceedings of the RESNA 20th Annual Conference, Jun. 1998; 3 pages.

"Innovation in Action," Biofeedback Motor Control GmbH; 2 pages.

Glas, V, "Chair Puts Player on the Joystick," Machine Design; Penton, Inc., vol. 63, No. 21, Oct. 24, 1991, p. 73.

"AGA's Atari Project Puffer Page," http://www.atarihq.com/othersec/puffer/index.html, retrieved from the internet on Sep. 19, 2002, 4 pages.

"The Legible City," www.jeffrey-shaw.net, retrieved from the internet on Sep. 19, 2002, 3 pages.

Antonoff, M, "Living in a Virtual World," Popular Science, Jun. 1993, 2 pages.

Antonoff, M, "Virtual Violence: Boxing without Bruises," Popular Science, Apr. 1993, 1 page.

Brown, S, "Video Cycle Race," Popular Science, May 1989, 1 page.

"Military: Arcade Aces," Popular Mechanics, Mar. 1982, 1 page.

"Suncom Aerobics Joystick," www.atarihq.com, Retreived from Internet Sep. 19, 2002, 1 page.

Aukstakalnis, et al., "The Art and Science of Virtual Reality: Silicon Mirage," pp. 197-205.

Hamit, F., "Virtual Reality and the Exploration of Cyberspace," Jun. 1, 1993, 4 pages.

"The Race Begins with $85," Randal Sports, 1990, 1 page.

"The New Exertainment System," Life Fitness, 1995, 1 page.

"The History of Nintendo (1889-1997)," Retrieved from Internet Aug. 24, 1998, pp. 1 and 9-10.

Skorupa, J., "Virtual Fitness," Sports Science, Popular Mechanics, Oct. 1994, 3 pages.

Manning R., "Videogame Players Get a Workout with the Exertainment," The Courier-Journal Sep. 25, 1994, 1 page.

Shah, "Mad Catz Universal MC2 Racing Wheel," Feb. 18, 2005.

"Universal S-Video/Audio Cable," Retrieved from the Internet, www.madcatz.com.

* cited by examiner

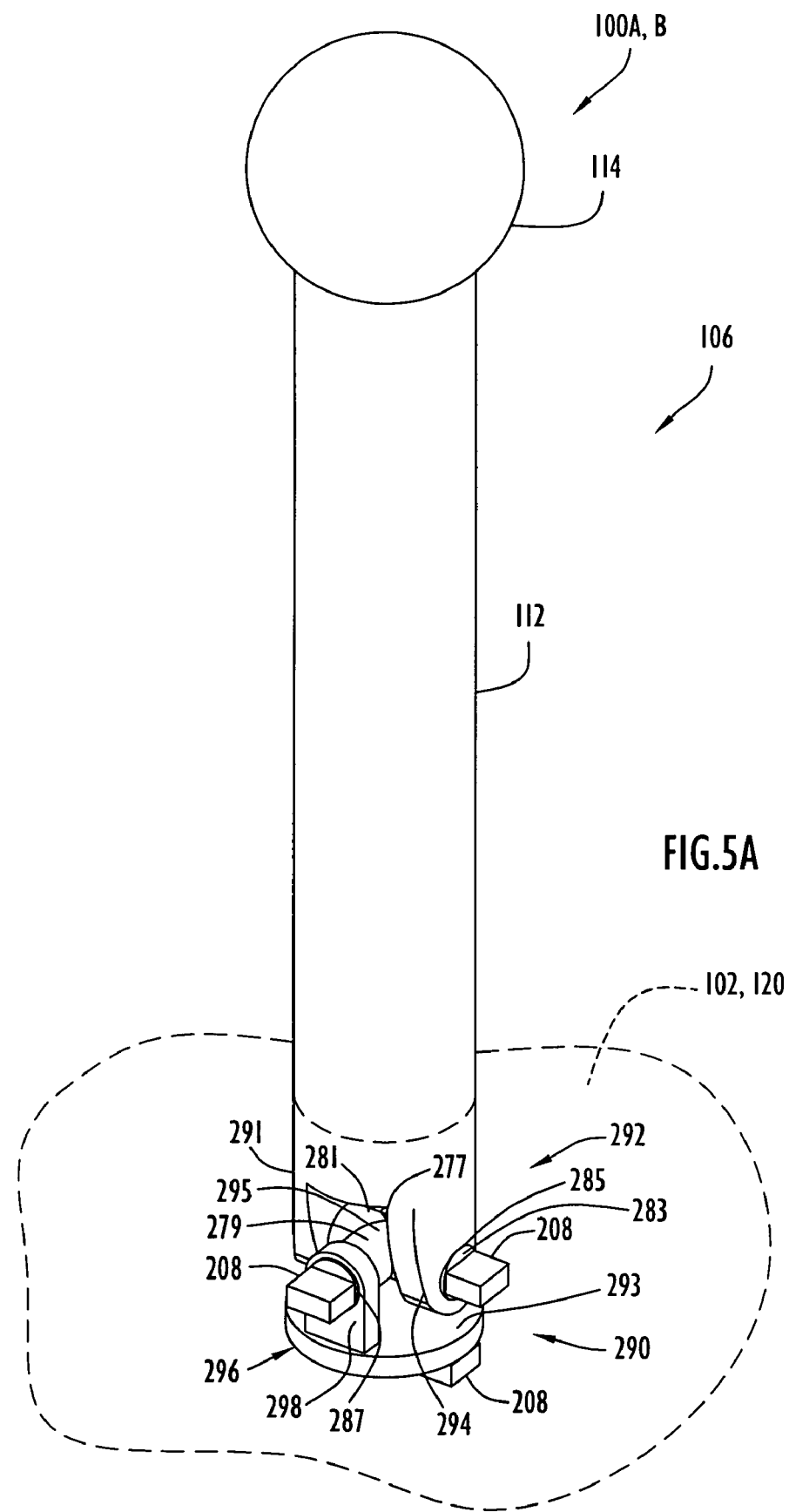

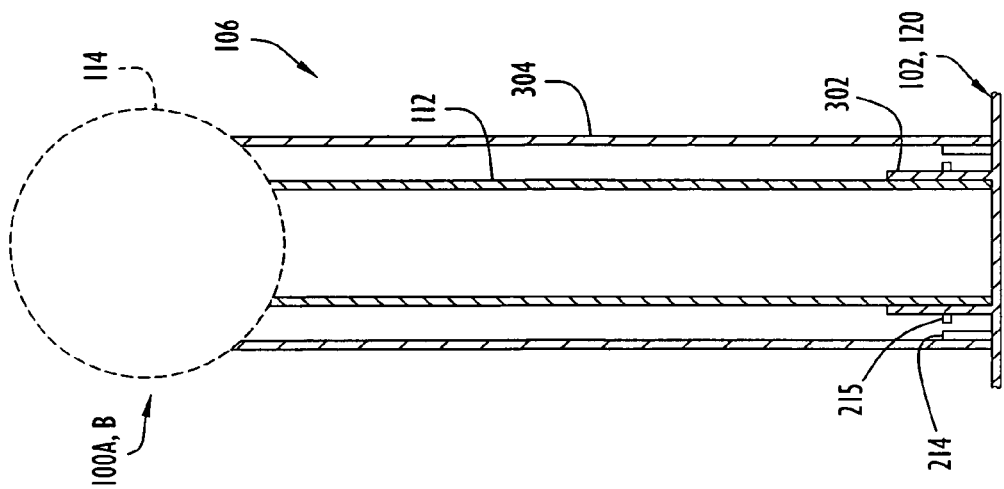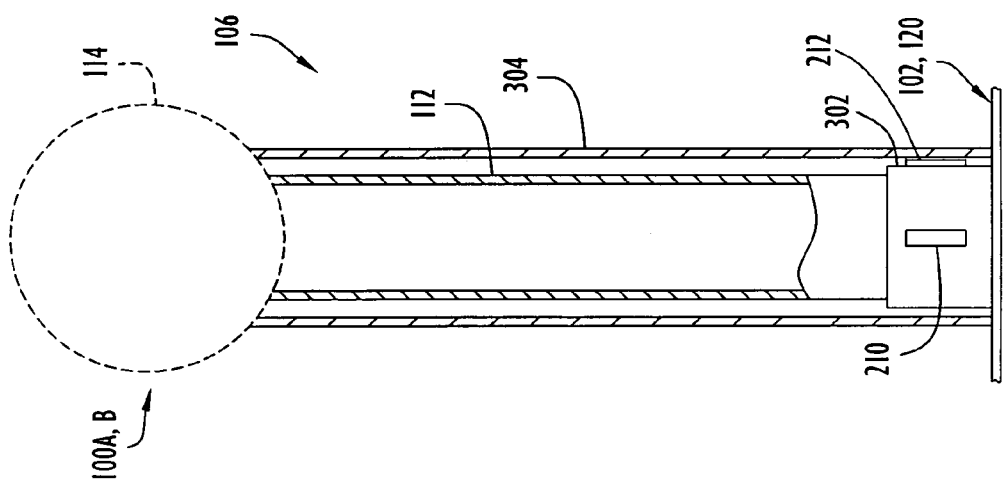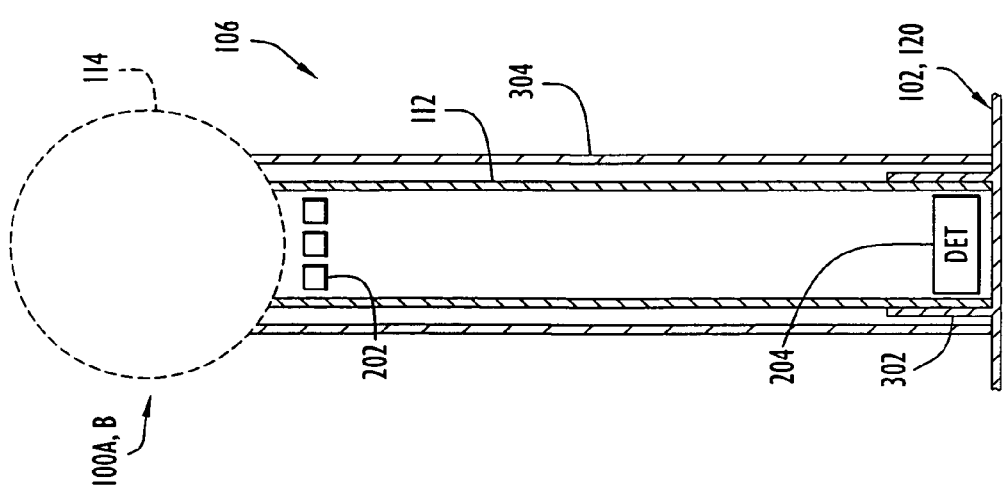

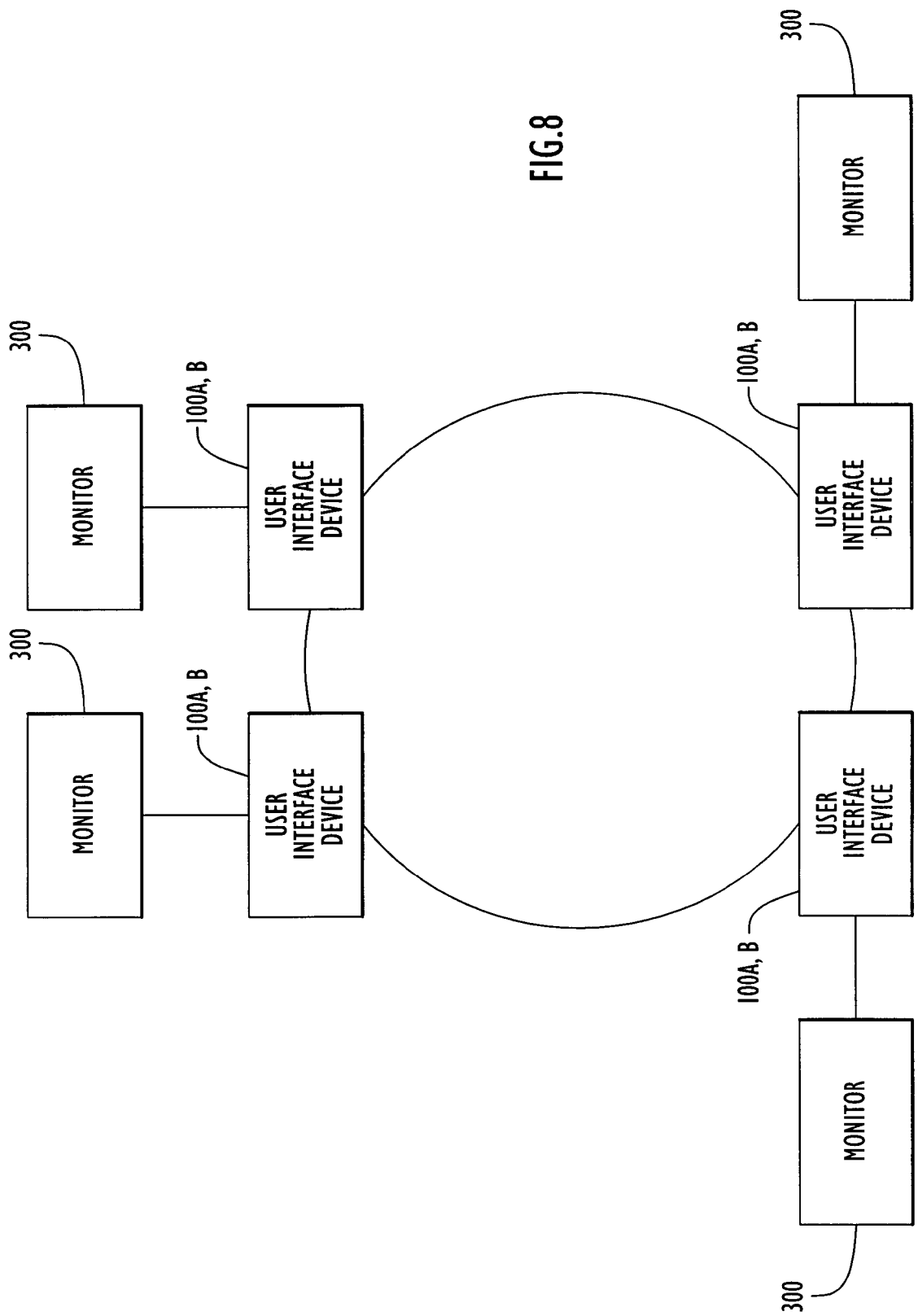

METHOD AND APPARATUS FOR OPERATIVELY CONTROLLING A VIRTUAL REALITY SCENARIO WITH A PHYSICALLY DEMANDING INTERFACE

CROSS-REFERENCE TO RELATED APPLICATIONS

This application is a Continuation-In-Part of U.S. patent application Ser. No. 10/975,185, entitled "Configurable Game Controller and Method of Selectively Assigning Game Functions to Controller Input Devices" and filed Oct. 28, 2004 now abandoned, which is a Continuation-In-Part of U.S. patent application Ser. No. 10/806,280, entitled "Game Controller Support Structure and Isometric Exercise System and Method of Facilitating User Exercise During Game Interaction" and filed Mar. 23, 2004 now abandoned, which is a Continuation-In-Part of U.S. patent application Ser. No. 10/309,565, entitled "Computer Interactive Isometric Exercise System and Method for Operatively Interconnecting the Exercise System to a Computer System for Use as a Peripheral" and filed Dec. 4, 2002 now U.S. Pat. No. 7,121,982. Moreover, U.S. patent application Ser. Nos. 10/975,185 and 10/806,280 further claim priority from U.S. Provisional Patent Application Ser. No. 60/514,897, entitled "Configurable Game Controller and Method of Selectively Assigning Game Functions to Controller Input Devices" and filed Oct. 29, 2003. In addition, the present application claims priority from U.S. Provisional Patent Application Ser. No. 60/739,915, entitled "Method and Apparatus for Operatively Controlling a Virtual Reality Scenario with a Physically Demanding Interface" and filed Nov. 28, 2005. The disclosures of the above-identified patent applications are incorporated herein by reference in their entireties.

BACKGROUND OF THE INVENTION

Obesity is currently considered an epidemic and is blamed for a host of physical, social and economic problems. The risk of obesity increases for children within certain groups. For example, childhood obesity rates are higher in lower socio-economic communities since children in these groups tend to remain indoors and engage in sedentary activities (e.g., such as playing video games) that provide minimal physical activity (or exercises) and burn fewer calories. This lack or reduced amount of physical activity tends to cultivate weight problems (or obesity) for the children.

OBJECTS AND SUMMARY OF THE INVENTION

Accordingly, it is an object of the present invention to control gaming or other virtual reality scenarios via a user interface device requiring users to engage in a physically demanding activity to interact with the virtual reality scenario.

It is another object of the present invention to utilize a universally compatible interface device with a wide variety of computer systems capable of executing "off the shelf" games or other software programs, where the compatibility of the system enables immediate (e.g., plug and play type) operation.

Yet another object of the present invention is to provide a physically demanding interface device with a control stick or rod manipulable by a user and configured for safe operation in the event the control rod inadvertently clashes with the user.

Still another object of the present invention is to enable children to engage in a physically demanding activity in order to control gaming or other virtual reality scenarios.

A further object of the present invention is to control gaming or other virtual reality scenarios via a user interface device that is safe for use by children and requires a child to engage in a physically demanding activity to interact with the virtual reality scenario.

The aforesaid objects may be achieved individually and/or in combination, and it is not intended that the present invention be construed as requiring two or more of the objects to be combined unless expressly required by the claims attached hereto.

According to the present invention, a safe, physically demanding interface device for children or other users to play video games includes a base and a joystick or control rod. The base supports a significant portion or the entirety of the child weight (e.g., supports a child in a seated or standing position), while the joystick is manipulable by the child to play the games. The device is configured to force the child to utilize many of the large muscle groups to interact with the game. Since the child weight is supported by the base, the interface device is stable (e.g., unlikely to tip or move) and, therefore, provides for safe, compelling video game play for users either alone or with other users.

BRIEF DESCRIPTION OF THE DRAWINGS

FIG. 5A is a view in perspective of the joystick of the user interface device of FIGS. 1 and 2 attached to the device base via a universal joint and utilizing potentiometers to determine joystick manipulation.

FIG. 6A is a view in elevation and partial section of the joystick of the user interface device of FIGS. 1 and 2 attached to the device base via a sleeve arrangement and utilizing image processing techniques to determine joystick manipulation.

FIG. 6B is a view in elevation and partial section of the joystick of the user interface device of FIGS. 1 and 2 attached to the device base via a sleeve arrangement and utilizing strain gauges to determine joystick manipulation.

FIG. 6C is a view in elevation and partial section of the joystick of the user interface device of FIGS. 1 and 2 attached to the device base via a sleeve arrangement and utilizing switches disposed at the junction of the base and sleeve arrangement to determine joystick manipulation.

FIG. 8 is a diagrammatic illustration of a series of physically demanding user interface devices according to the present invention arranged in a ring type network topology to facilitate video game play with a plurality of users.

DETAILED DESCRIPTION OF THE PREFERRED EMBODIMENTS

Figure 1:
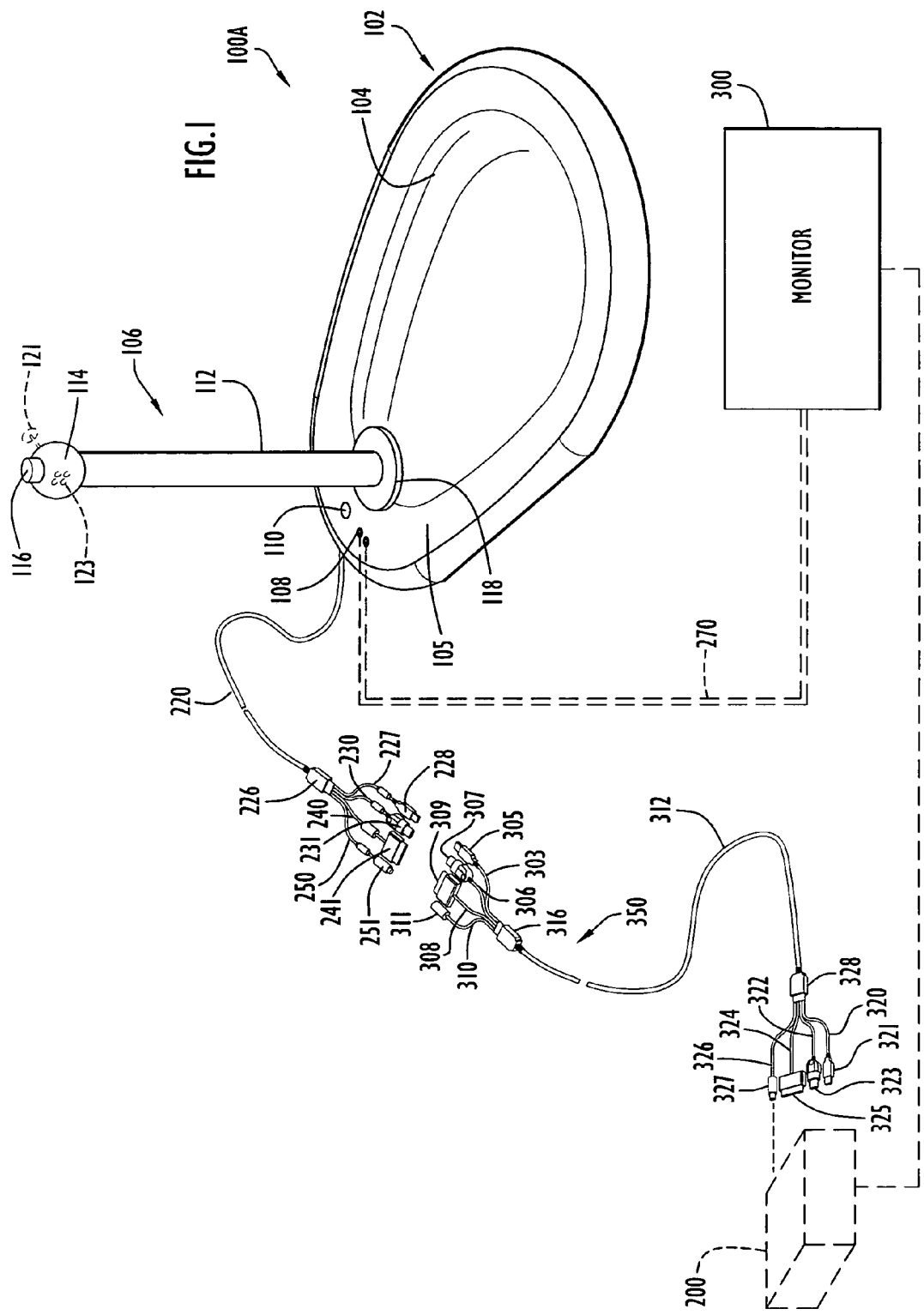
FIG. 1 is view in perspective of a physically demanding user interface device according to the present invention.

A user interface device to accommodate a user in a seated position according to the present invention is illustrated in FIG. 1. Initially, a user interface device 100a according to the present invention includes control circuitry 50 (FIG. 7A) including a processor 52 with various gaming applications, and is coupled directly to a monitor 300 to display a game scenario as described below. Alternatively, the user interface device may serve as a game controller and include control circuitry 50 (FIG. 7B) including a processor 62 to process information for transference to a game processor 200. The game processor may be coupled to monitor 300 to display a game scenario. The game processor includes a storage drive and/or unit to receive computer readable media (e.g., CD, DVD, etc.) containing software for various games and a processing device to execute the software to provide games on the monitor. The game processor may be implemented by any conventional or other processing or gaming system (e.g., microprocessor system, personal computer, video gaming system, etc.). For example, the game processor may be implemented by conventional video game systems, such as PS2 available from Sony, XBOX available from Microsoft or GAMECUBE available from Nintendo.

The games generally include characters or objects that are controlled by a user via a controller. For example, the user may control movement and actions of a character or a vehicle (e.g., car, airplane, boat, etc.) to move through a virtual environment displayed on a monitor. The controller includes a plurality of input devices (e.g., joystick, buttons, etc.) to enable a user to interact with the game. A processor executing a gaming application receives signals from the controller and updates a corresponding display to reflect the movements and/or actions of the character or object as indicated by user manipulation of the controller.

Figure 7A:
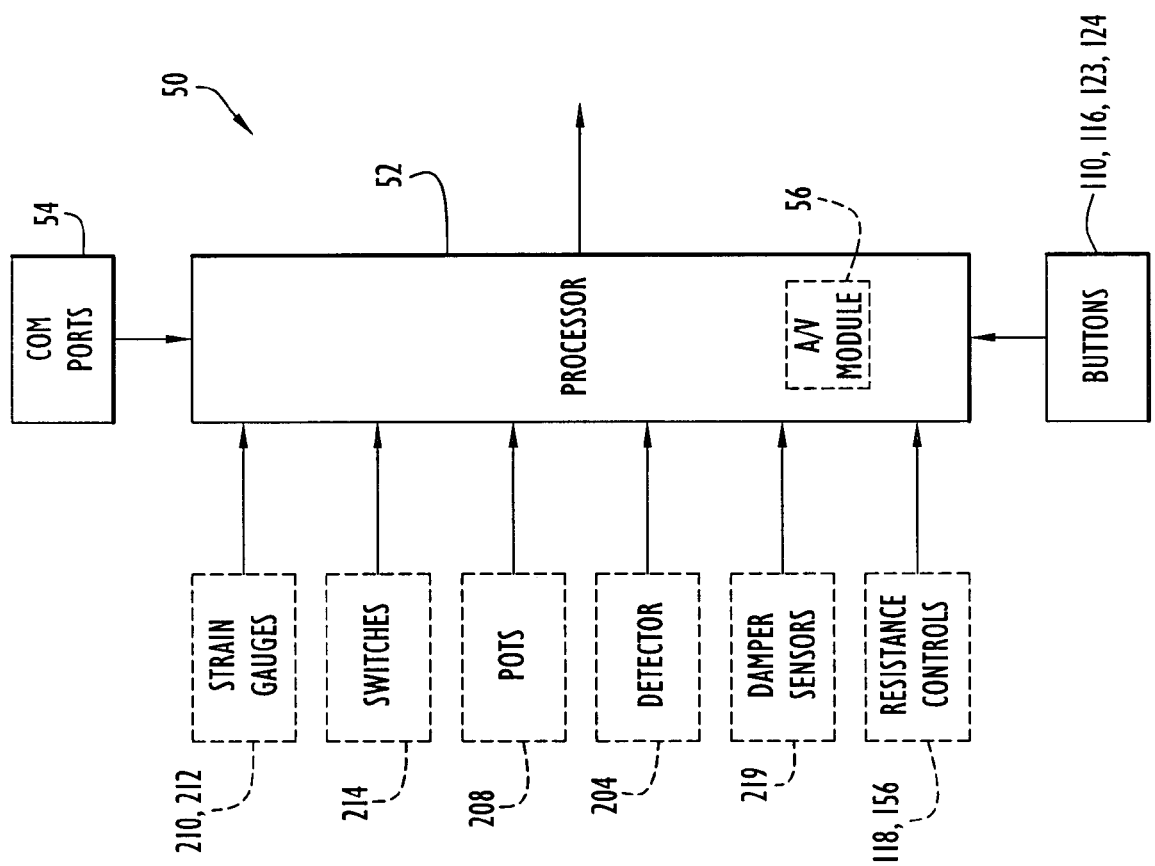
FIG. 7A is a block diagram of an exemplary control circuit for the interface device of FIGS. 1 and 2 configured to include and execute gaming applications.
Figure 7B:
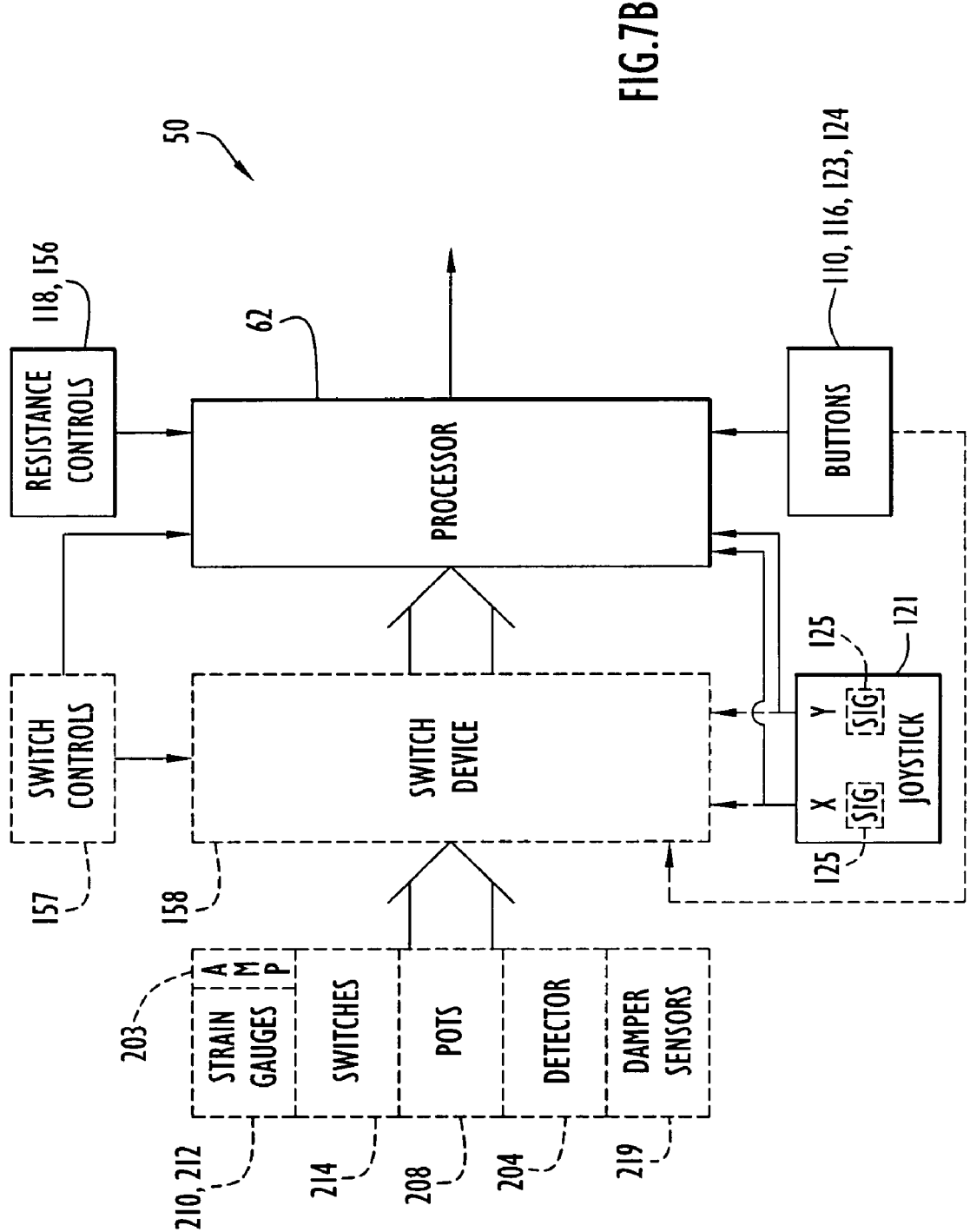
FIG. 7B is a block diagram of an exemplary control circuit for the interface device of FIGS. 1 and 2 configured to serve as a game controller for a game processor.

User interface device 100a of the present invention is configured to require a user to perform a physically demanding activity or provide physical exertion in order to manipulate the interface device and control a game scenario. In other words, the device is configured to force a user to utilize many of the large muscle groups to interact with the game. Specifically, user interface device 100a includes a base 102 preferably in the form of a platform, a joystick 106 and control circuitry 50 (FIGS. 7A, 7B). Base 102 is generally elliptical (or egg-shaped) and includes a recessed or concave surface portion 104. The recessed portion is defined in a rear portion of the base top surface and is configured to contour and support a user in a seated position. A control portion 105 is defined within a front portion of the base top surface and is raised or elevated relative to recessed portion 104. Control portion 105 receives joystick 106 as described below. The base may be placed on any desired surface for game play (e.g., floor, sofa, chair, etc.). The base bottom portion is typically smooth with rounded edges and sufficiently wide and deep to support the weight of the user. The user weight provides stability for the interface device in response to forces applied to the joystick by a user to interact with a video game as described below.

Joystick 106 is removably attached to base control portion 105, and includes a rod 112 extending upward from the base. By way of example, the joystick includes a length of approximately twenty inches. The rod includes a substantially spherical knob or head 114 attached to the rod top portion with a button type input device 116 disposed on a knob top surface. Input device 116 preferably enables performance of game selection and weapon firing functions. The joystick and/or base may include other input devices (e.g., buttons, joysticks or other input devices that the user may adjust through weight shifting or by stepping or otherwise triggering sensors) to enable various interaction with the video games.

The user interface device measures forces and/or motions applied to the joystick by a user as described below (e.g., in the X and Y axes, rotational forces, etc.) to interact with the video game. The joystick preferably includes two degrees of freedom (e.g., motion along X and Y axes) with a range of motion of approximately eighteen inches along each degree of freedom or axis. In order to reduce the risk of injury, the joystick is preferably constructed of a lightweight material (e.g., hollow polypropylene, etc.) to reduce momentum, while the user interface device includes constraining devices (e.g., damper mechanisms, etc.) to limit velocity of the joystick. The combination of low mass and constrained velocity produces a controlled force of less than approximately 100 Joules, or 70 foot-lbs, that minimizes user injury in the event the joystick clashes with the user during game play. This enables the interface device to be safe, especially for use by children.

The effort needed to manipulate the joystick may be adjustable. Accordingly, a substantially annular dial 118 is disposed on control portion 105 about the rod bottom portion to set the desired resistance for the joystick. The interface device may alternatively include resistance input devices 156 (FIGS. 7A, 7B) to enter resistance controls. Devices 156 may be implemented by any conventional or other input devices (e.g., buttons, slides, switches, etc.) and may be disposed at any suitable locations. Further, base control portion 105 includes a reset button 110 disposed adjacent dial 118 to reset the user interface device, and audio and/or video output ports 108 disposed adjacent reset button 110 to removably receive a cable 270 to connect the user interface device directly to monitor 300. The audio/video ports may be of any quantity and may be implemented by any conventional or other ports.

Alternatively, the user interface device may include a cable system 220 attached to and extending from the base to connect the interface device to game processor 200 as described below. In this case, additional input devices may be mounted to joystick 106 to enable the user to interact with the game processor (e.g., option selection, weapon firing, etc.) By way of example, joystick 106 may include supplemental joystick 121 and buttons 123 disposed on knob 114 and/or rod 112 to enable the user to manipulate these additional devices along with joystick 106 for interaction with a game scenario. The interface device generally includes respective signal sources (e.g., variable resistor or potentiometers) to provide signals indicating motion of joystick 121 along X (e.g., left/right motions) and Y (e.g., forward/back motions) axes. For example, joystick 121 may be associated with signal sources 125 (FIG. 7B) (e.g., variable resistor or potentiometers) to provide signals indicating motion of that joystick along X and Y axes. Further, the interface device may include switch controls 157 to control function assignment of the interface device input mechanisms (e.g., joysticks 106, 121, buttons 116, 123, etc.) as described below. Switch controls 157 may be implemented by any conventional or other input devices (e.g., buttons, slides, switches, etc.). However, the interface device may include any quantity of any type of input devices (e.g., buttons, switches, slides, a keypad, joystick, etc.) and signal sources disposed at any location and arranged in any fashion on the interface device. The input devices may be utilized to enter any desired information (e.g., enter desired user actions for the game, etc.).

Figure 2:
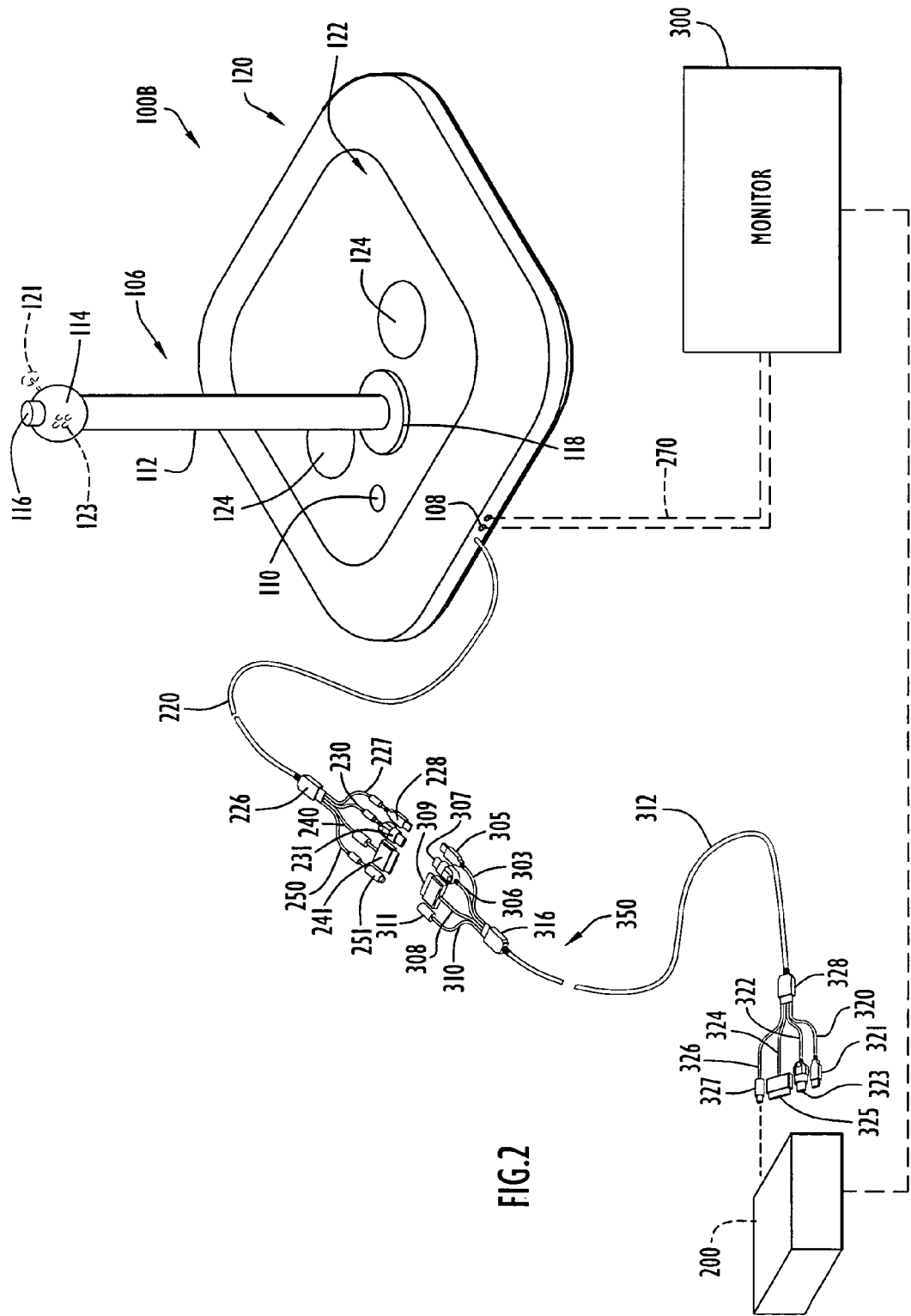
FIG. 2 is a view in perspective of an alternative embodiment of a physically demanding user interface device according to the present invention.

An alternative user interface device to accommodate a user in a standing position according to the present invention is illustrated in FIG. 2. Initially, a user interface device 100b according to the present invention includes processor 52 (FIG. 7A) with various gaming applications, and is coupled directly to monitor 300 to display a game scenario as described above. Alternatively, user interface device 100b may include processor 62 (FIG. 7B) and be coupled to game processor 200 that displays a game scenario on monitor 300 as described above. The game processor is substantially similar to the game processor described above and includes a storage drive and/or unit to receive computer readable media (e.g., CD, DVD, etc.) containing software for various games and a processing device to execute the software to provide games on the monitor.

User interface 100b of the present invention is configured to require a user to perform a physically demanding activity or provide physical exertion to manipulate the interface device and control a game scenario. In other words, the device is configured to force a user to utilize many of the large muscle groups to interact with the game. Specifically, user interface device 100b includes a base 120 preferably in the form of a platform, joystick 106 and control circuitry 50 (FIGS. 7A, 7B). The joystick and control circuitry are substantially similar to the corresponding components described above. Base 120 is generally rectangular with rounded corners and supports a user in a standing position on the base top surface. The base is preferably placed on a substantially flat surface for game play (e.g., floor, etc.) and is sufficiently wide and deep to ensure the user remains on the base (e.g., does not accidentally step off) during use. The user weight provides stability for the interface device in response to forces applied to the joystick by a user to interact with a video game as described below.

Joystick 106 is removably attached to the base toward a front base portion, and includes rod 112 extending upward from the base as described above. By way of example, the joystick includes a length of approximately thirty inches. The rod includes substantially spherical knob or head 114 attached to the rod top portion as described above. The rod and knob are substantially similar to the corresponding components described above.

Base 120 further includes input devices 124 disposed on the base top surface toward the base front portion with joystick 106 disposed between the input devices. Input devices 124 are preferably in the form of buttons that are typically actuated in response to depression or application of force by user feet in order to perform game selection and weapon firing functions as described above. These devices may be positioned to require a user to make a particular effort for actuation (e.g., positioned proximate the far side of the joystick), or be disposed in the area of the base that supports the user. The input devices may further be disabled by the user. Input devices or buttons 124 may be configured in various manners. For example, the configurations may include a quantity of buttons in the approximate range of two through nine that are arranged to support several game interactions of varying complexity (e.g., from simple game interactions to complex game interactions, such as dance type game interactions, etc.). The joystick and/or base may include other input devices (e.g., buttons, joysticks or other input devices that the user may adjust through weight shifting or by stepping or otherwise triggering sensors) to enable various interaction with the video games.

User interface 100b measures forces and/or motions applied to the joystick by a user as described below (e.g., in the X and Y axes, rotational forces, etc.) to interact with the video game. The joystick preferably includes two degrees of freedom (e.g., motion along X and Y axes) with a range of motion of approximately twenty-two inches along each degree of freedom or axis. In order to reduce the risk of injury, the joystick is preferably constructed of a lightweight material (e.g., hollow polypropylene, etc.) to reduce momentum, while the user interface device includes constraining devices (e.g., damper mechanisms, etc.) to limit velocity of the joystick. The combination of low mass and constrained velocity produces a controlled force of less than approximately 100 Joules, or 70 foot-lbs, that minimizes user injury in the event the joystick clashes with the user during game play. This enables the interface device to be safe, especially for use by children.

The effort needed to manipulate the joystick may be adjustable as described above. Accordingly, substantially annular dial 118 may be disposed about the rod bottom portion to enable a user to set the desired resistance for the joystick. The interface device may alternatively include resistance input devices 156 disposed at any suitable locations to enter resistance controls. Further, the base includes reset button 110 disposed adjacent dial 118 to reset the user interface device, and audio and/or video output ports 108 disposed on a base front surface to removably receive cable 270 to connect the user interface device directly to monitor 300 as described above. The dial, resistance input devices, reset button and audio/video ports are substantially similar to the corresponding components described above.

Alternatively, user interface device 100*b* may include cable system 220 attached to and extending from the base to connect the interface device to game processor 200 as described above. In this case, additional input devices may be mounted to joystick 106 to enable the user to interact with the game processor (e.g., option selection, weapon firing, etc.) as described above. By way of example, joystick 106 may include supplemental joystick 121 and buttons 123 disposed on knob 114 and/or rod 112 to enable the user to manipulate these additional devices along with joystick 106 for interaction with a game scenario as described above. The interface device generally includes respective signal sources 125 (FIG. 7B) (e.g., variable resistor or potentiometers) to provide signals indicating motion of joystick 121 along X (e.g., left/right motions) and Y (e.g., forward/back motions) axes as described above. Further, the interface device may include switch controls 157 to control function assignment of interface device input devices (e.g., joysticks 106, 121, buttons 123, 124, etc.) as described above. However, the interface device may include any quantity of any type of input devices (e.g., buttons, switches, slides, a keypad, joystick, etc.) and signal sources disposed at any location and arranged in any fashion on the interface device. The input devices may be utilized to enter any desired information (e.g., enter desired user actions for the game, etc.).

Joystick 106 may be attached to base 102, 120 in various manners with the interface device employing varying techniques to measure manipulation of the joystick relative to the base. In particular, joystick 106 may be directly attached to base 102, 120 as illustrated in FIGS. 3A-3G. Specifically, interface device 100*a*, 100*b* may be in the form of an integral unit with joystick 106 being mounted fixedly to base 102, 120 (e.g., without moving components, pivots, joints or gimbals). In this case, manipulation of joystick 106 and/or knob 114 may be monitored in various manners. Referring to FIG. 3A, a camera or photodetector 204 may be mounted within rod 112 at the rod end proximate base 102, 120 with the rod interior within the detector field of view. Passive colored patterns or active light emitting or other illuminating devices 202 (e.g., LEDs, etc.) may be placed at the opposing rod end toward knob 114. The photodetector and light emitting devices may be implemented by any conventional or other devices to emit and detect light or other energy media (e.g., camera, LED, photodetectors, etc.), and may be disposed at any suitable locations. Detector 204 captures images of the field of view (e.g., rod interior), where the patterns or emitted light are displaced within the rod and captured image due to manipulation or deflection of the rod by a user.

Interface device processor 52, 62 (FIGS. 7A, 7B) may include image recognition software to process the captured images and determine the amount of deflection or manipulation of rod 112 by the user based on the displaced patterns or emitted light in the resulting image. For example, the pattern or arrangement of emitted light may be in a certain area (e.g., substantially centered, etc.) within the detector field of view when the joystick is in a reference position (e.g., centered, in the absence of a deflection, etc.). This image, or a previously captured image, may serve as a reference image. However, when a user applies force to joystick 106, the pattern or emitted light arrangement shifts within the field of view in accordance with joystick motion and is displaced within the resulting image. The newly captured image may be compared to the reference image by processor 52, 62 via conventional image processing techniques to determine the amount of displacement of the pattern or emitted light arrangement within the image. This displacement is proportional to the amount of rod deflection. The processor processes the captured image to determine the rod deflection and updates the game scenario in accordance with the forces applied to the joystick by a user.

Figure 3C:
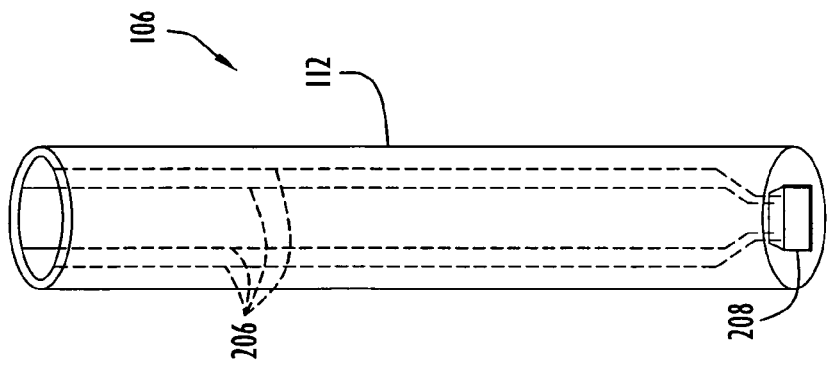
FIG. 3C is a view in perspective of the cable arrangement within the joystick of FIG. 3B.
Figure 3B:
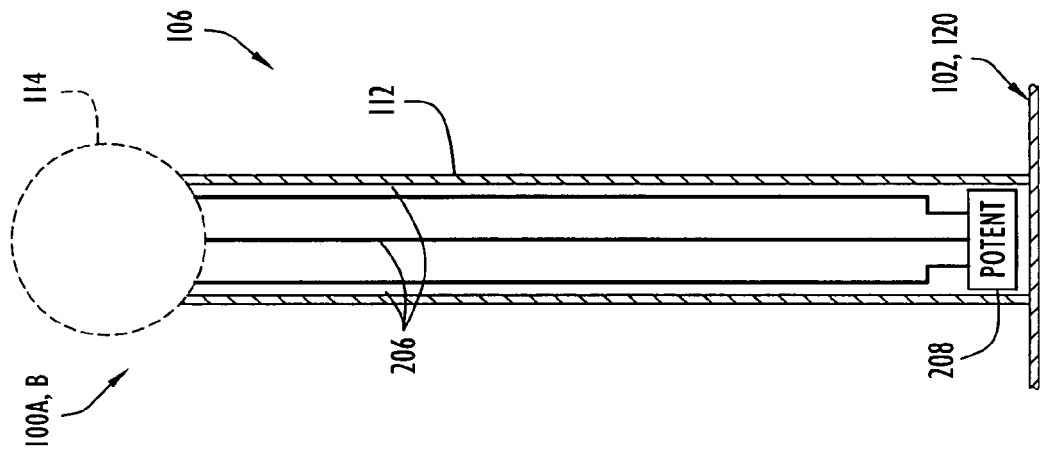
FIG. 3B is a view in elevation and partial section of the joystick of the user interface device of FIGS. 1 and 2 attached to the device base and utilizing cables and potentiometers to determine joystick manipulation.
Figure 3A:
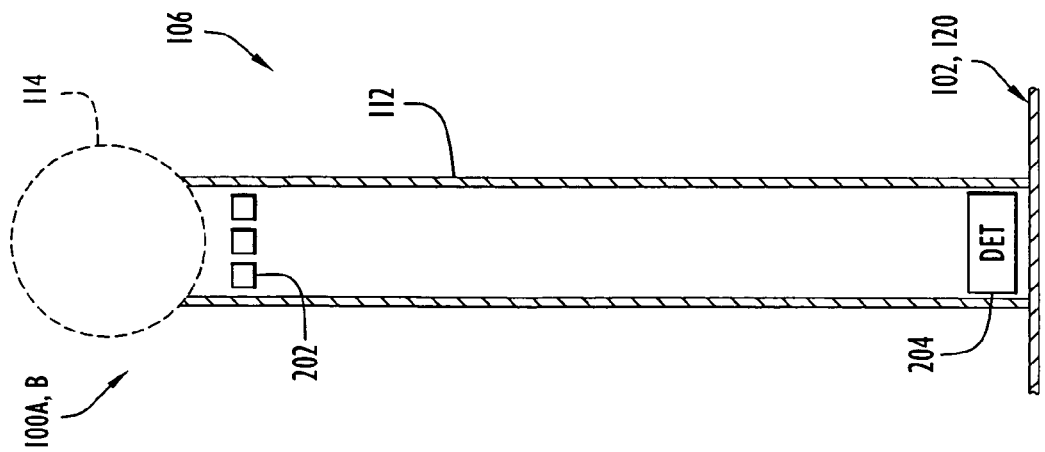
FIG. 3A is a view in elevation and partial section of the joystick of the user interface device of FIGS. 1 and 2 attached to the device base and utilizing image processing techniques to determine joystick manipulation.

An alternative arrangement to measure rod deflection is illustrated in FIGS. 3B-3C. In particular, a series of cables 206 may be disposed along the interior of rod 112. By way of example, cables 206 may include four cables each angularly offset from each other by approximately ninety degrees; however, the rod may include any quantity of cables disposed within the rod in any fashion. The cables extend from a rod portion proximate knob 114 toward the rod portion proximate base 102, 120. A set of potentiometers 208 are disposed within rod 112 proximate base 102, 120 with each cable coupled to a corresponding potentiometer to control the variable resistance of that potentiometer. The potentiometers may be of any quantity, may be disposed at any suitable locations, and may be implemented by any conventional or other devices with any variable property (e.g., electrical, chemical, mechanical, resistance, capacitance, magnetic, etc.) to indicate rod deflection. When a user applies force to joystick 106, corresponding rod surfaces stretch, while other or opposing surfaces contract. The cables attached to these surfaces are consequently manipulated by the stretching (e.g., elongated or pulled for stretching, pushed or compressed for contracting, etc.) and alter resistance of corresponding potentiometers 208. The altered resistances result in a voltage change that may be measured by control circuitry 50 (FIGS. 7A, 7B) to determine the amount of deflection or manipulation of the joystick. The control circuitry processes the measured information to update the game scenario in accordance with the forces applied to the joystick by a user.

Figure 3G:
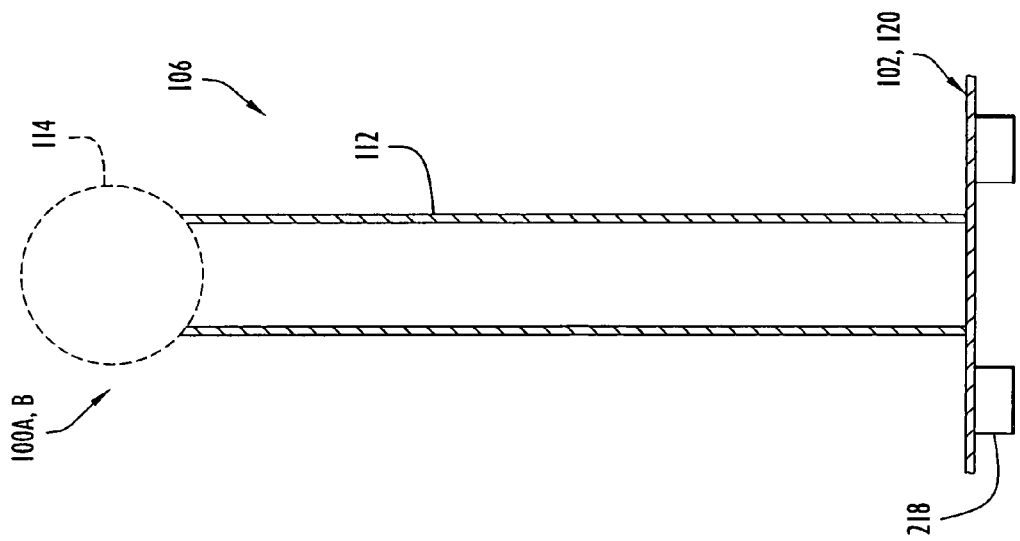
FIG. 3G is a view in elevation and partial section of the joystick of the user interface device of FIGS. 1 and 2 attached to the device base and utilizing limit switches or load cells disposed within the base to determine joystick manipulation.
Figure 3E:
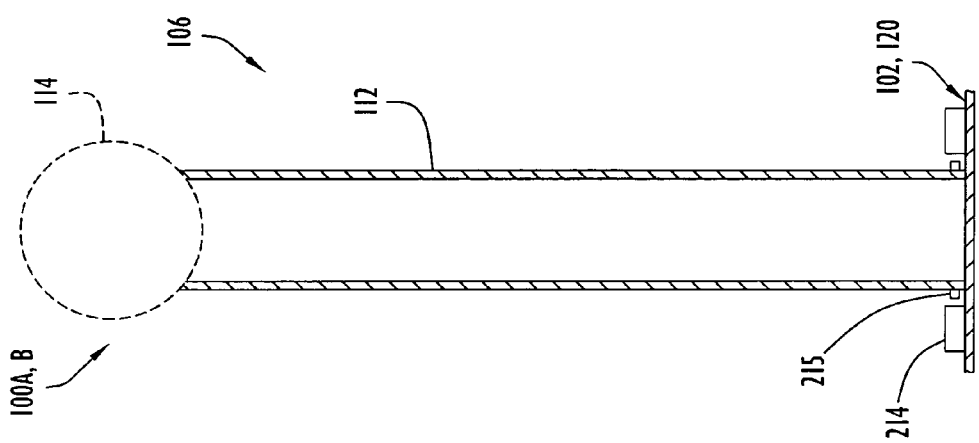
FIG. 3E is a view in elevation and partial section of the joystick of the user interface device of FIGS. 1 and 2 attached to the device base and utilizing switches disposed at the junction of the base and joystick to determine joystick manipulation.
Figure 3D:
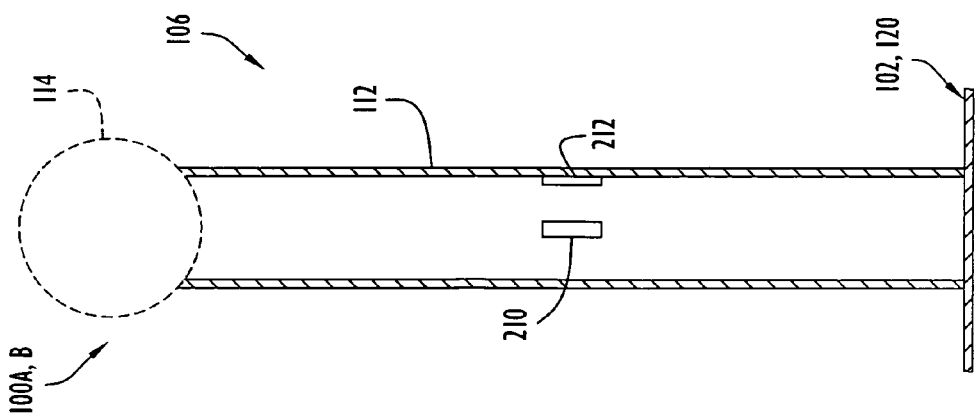
FIG. 3D is a view in elevation and partial section of the joystick of the user interface device of FIGS. 1 and 2 attached to the device base and utilizing strain gauges to determine joystick manipulation.

Referring to FIG. 3D, strain gauges may be employed to measure deflection of rod 112. In particular, strain gauge sensors 210, 212 may be arranged at suitable locations on the rod interior surface, preferably at an intermediate location. These sensors measure the amount of a strain deformation applied to the joystick as a result of the user applying pushing, pulling or lateral forces to the joystick. By way of example only, sensor 212 may measure forces applied to the joystick along an X-axis (e.g., lateral or left/right forces), while sensor 210 may measure forces applied to the joystick along a Y-axis (e.g., push/pull or forward/backward forces). The strain gauge sensors may be arranged with respect to the joystick in any suitable manner to measure forces, such as the manners disclosed in the aforementioned patent applications. For example, the strain gauge sensors may be attached directly or indirectly to a joystick exterior or interior surface to measure the applied forces. The resistance of the strain gauge sensors is measured to determine deflection or manipulation of the joystick. The strain gauge sensors are connected to control circuitry 50 (FIGS. 7A, 7B), where the control circuitry processes the information to update the game scenario in accordance with strain forces applied to the joystick by a user.

The joystick manipulation may further be measured via switches as illustrated in FIG. 3E. In particular, a series of switches 214 may be mounted in base 102, 120 around the periphery of rod 112. The rod may include contacts or actuating members 215 disposed on the rod exterior surface, preferably coincident a corresponding switch 214. The switches may be implemented by any conventional or other switching devices (e.g., switches, contacts, relays, etc.), while the contacts may be implemented by any conventional or other contacts or members to actuate the switches. The switches and contacts may be of any quantity and may be disposed at any suitable locations. When a user applies force to the joystick, the joystick is typically displaced, where one or more contacts 215 may actuate corresponding switches 214. The actuated switch provides a signal to control circuitry 50 (FIGS. 7A, 7B). The particular switches actuated in response to manipulation of the joystick indicate the direction and motion of the joystick by the user. The control circuit processes the information to update the game scenario in accordance with the forces applied to the joystick by a user.

Figure 3F:
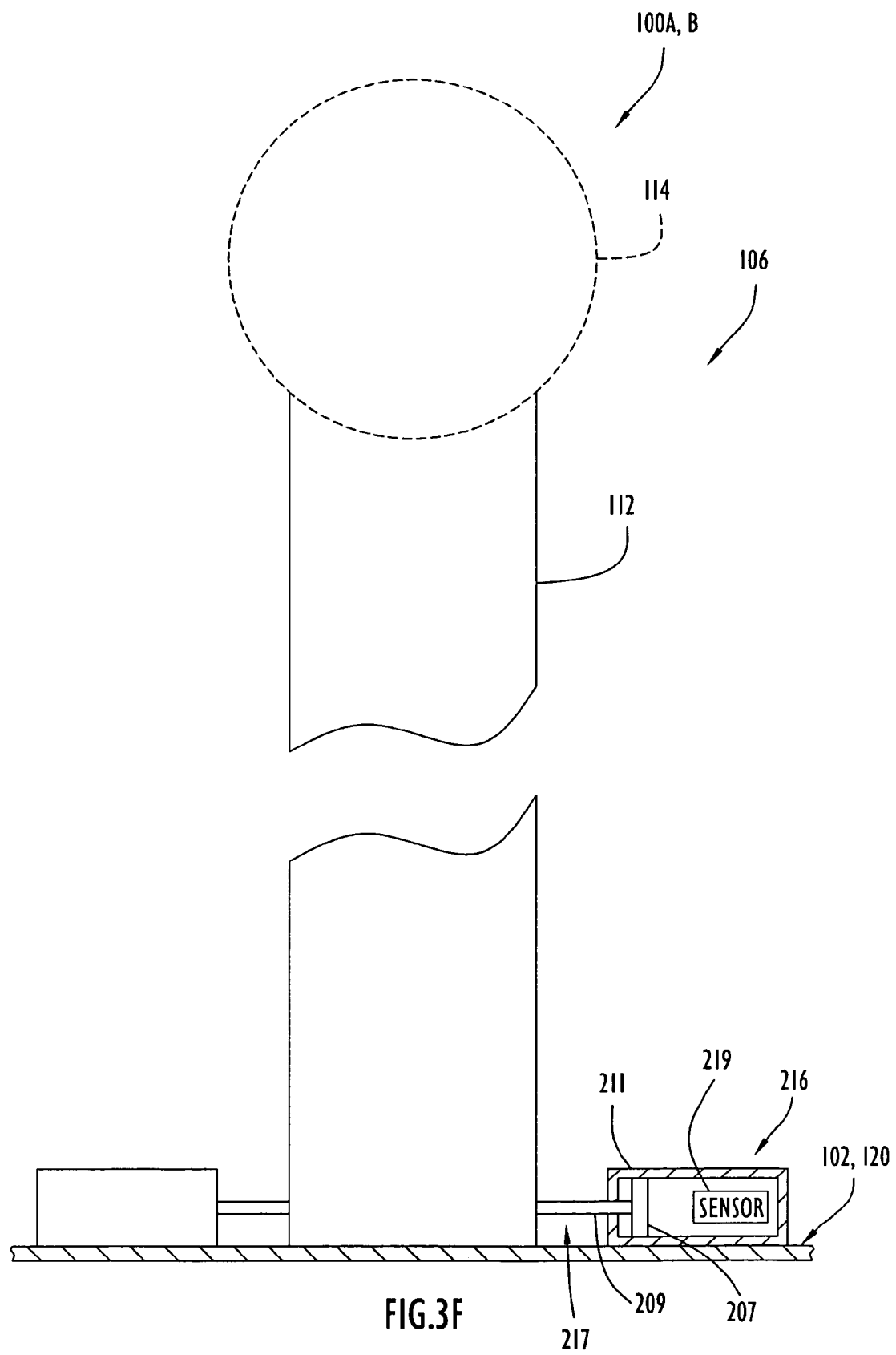
FIG. 3F is a view in elevation and partial section of the joystick of the user interface device of FIGS. 1 and 2 attached to the device base and utilizing damper mechanisms disposed at the junction of the base and joystick to determine joystick manipulation.

Referring to FIG. 3F, the joystick manipulation may be measured by a series of linear damper mechanisms. In particular, a series of linear damper mechanisms 216 are mounted in base 102, 120 and around the periphery of the bottom portion of rod 112. The damper mechanism may be implemented by any conventional or other damping devices or mechanisms (e.g., dampers, elastic members, etc.), such as the damping mechanisms disclosed in U.S. Pat. No. 4,588,054 (LeBaron), the disclosure of which is incorporated herein by reference in its entirety. By way of example only, each damper mechanism 216 is in the form of a shock absorber and includes a cylinder 211 and a piston 217. The piston includes a piston head 207 disposed within cylinder 211 and a piston rod 209 coupled to head 207 and extending therefrom external of the cylinder. Cylinder 211 is mounted to base 102, 120, while the distal end of piston rod 209 external of the cylinder is coupled to the lower portion of rod 112. The piston is urged in a reciprocal motion within cylinder 211 in response to joystick motion. The damper mechanism may further include a resistance mechanism to impede the reciprocal motion of the piston within cylinder 211. The resistance mechanism may be in the form of a spring disposed within cylinder 211 and coupled to the piston, or in the form of pressurized fluid within the cylinder.

Damper mechanism 216 further includes a sensing device 219 to measure the amount of piston motion. The sensing device may be coupled to the piston rod and/or head and may be implemented by any suitable sensors (e.g., encoders, potentiometers, etc.). When a user applies force to the joystick, piston rods 209 coupled to the joystick produce a reciprocal piston motion within corresponding cylinders. The positions (or amount and direction of motion) of the pistons within the damper mechanisms are measured by corresponding sensors 219. These measurements indicate joystick manipulation and are provided to control circuitry 50 (FIGS. 7A, 7B). The control circuitry processes the information to update the game scenario in accordance with the forces applied to the joystick by a user.

In addition, joystick manipulation may be determined based on forces applied to the base as illustrated in FIG. 3G. In particular, base 102, 120 includes sensors 218, preferably in the form of limit switches or load cells. These sensors may be disposed at any suitable location on or within the base and measure the amount of tilting forces applied to the base (e.g., the amount of base tilting or potential tilting). Since joystick 106 is connected directly to base 102, 120 as described above, forces applied to joystick 106 or knob 114 follow a load path through the base and to the floor or other supporting surface, thereby resulting in a signal measurable by sensors 218. The sensors measure these forces (or tilt of the base) to determine the amount of force applied to the joystick (e.g., joystick manipulation). Sensors 218 are connected to control circuitry 50 (FIGS. 7A, 7B), where the control circuitry processes the information to update the game scenario in accordance with the forces applied to the joystick by a user.

Joystick 106 may alternatively be attached to base 102, 120 via a ball and socket arrangement as illustrated in FIGS. 4A-4D. In particular, rod 112 is substantially cylindrical with a tapered bottom portion. A generally spherical ball 280 is disposed at the rod bottom end, while base 102, 120 includes a generally spherical socket 282 to receive ball 280. The dimensions of socket 282 are slightly less than those of the intermediate dimensions of ball 280 to retain the ball within the socket in a fashion permitting ball rotation. The rod and base are constructed of semi-rigid materials to enable slight compression of the ball and/or socket for removable insertion of ball 280 within socket 282. The rod tapered portion prevents the rod from interfering with the base during game play and enables manipulation of the joystick in various directions.

Figure 4C:
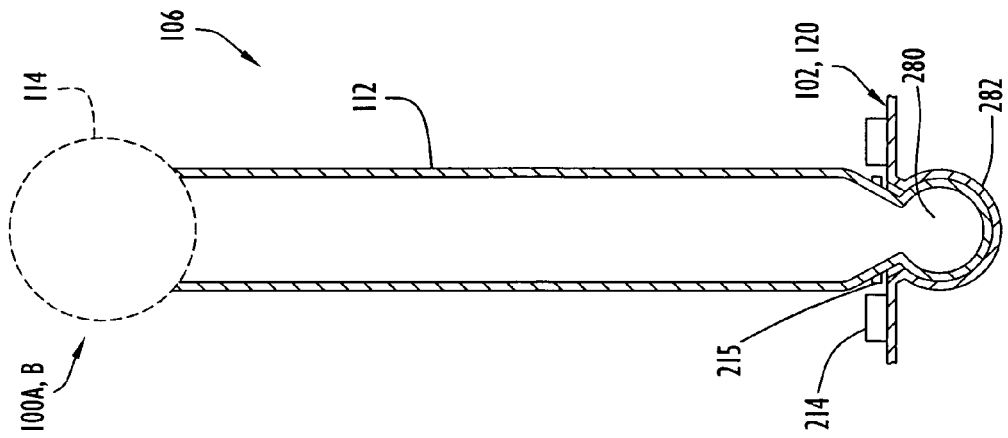
FIG. 4C is a view in elevation and partial section of the joystick of the user interface device of FIGS. 1 and 2 attached to the device base via a ball and socket arrangement and utilizing switches disposed at the junction of the base and joystick to determine joystick manipulation.

Manipulation of joystick 106 and/or knob 114 may be monitored in various manners with the interface device employing varying techniques to measure the joystick manipulation relative to the base. Referring to FIG. 4A, a camera or photodetector may be utilized to measure joystick manipulation in substantially the same manner described above. Specifically, camera or photodetector 204 may be mounted within base 102, 120 proximate rod 112 with knob 114 within the detector field of view. Passive colored patterns or active light emitting or other illuminating devices 202 (e.g., LEDs, etc.) may be placed on the knob exterior surface. The photodetector and light emitting devices are substantially similar to the devices described above and may be disposed at any suitable locations. Detector 204 captures images of the field of view (e.g., knob 114), where the patterns or emitted light are displaced within the captured image due to manipulation or deflection of the joystick by a user.

Interface device processor 52, 62 (FIGS. 7A, 7B) may include image recognition software to process the captured images and determine the amount of deflection or manipulation of joystick 106 by the user based on the displaced patterns or emitted light in the resulting image as described above. For example, the pattern or arrangement of emitted light may be in a certain area (e.g., substantially centered, etc.) within the detector field of view when the joystick is in a reference position (e.g., centered, etc.). This or a previously captured image may serve as a reference image. However, when a user applies force to joystick 106, the pattern or emitted light arrangement shifts within the field of view in accordance with joystick motion and is displaced within the resulting image. The newly captured image may be compared to the reference image via conventional image processing techniques as described above to determine the amount of displacement of the pattern or emitted light arrangement within the image. This displacement is proportional to the amount of joystick manipulation (e.g., direction, distance of joystick motion, etc.). The processor processes the captured image to determine the joystick manipulation and updates the game scenario in accordance with the forces applied to the joystick by a user.

Figure 4B:
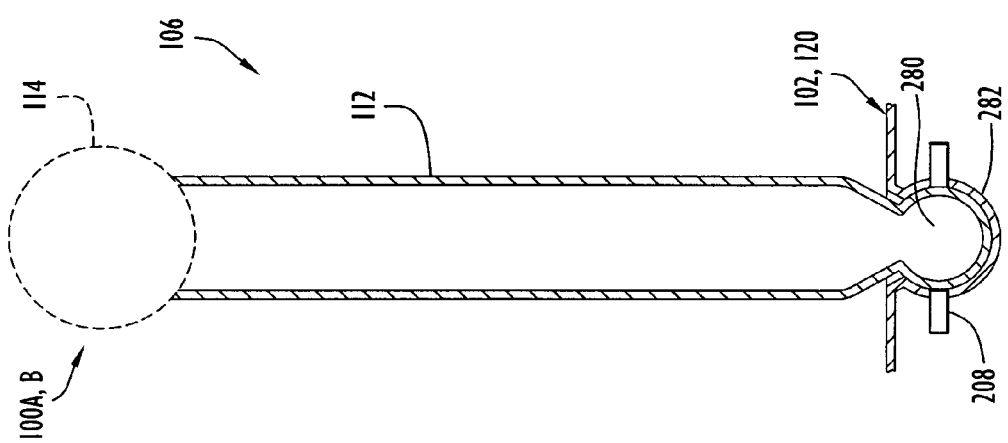
FIG. 4B is a view in elevation and partial section of the joystick of the user interface device of FIGS. 1 and 2 attached to the device base via a ball and socket arrangement and utilizing potentiometers to determine joystick manipulation.
Figure 4A:
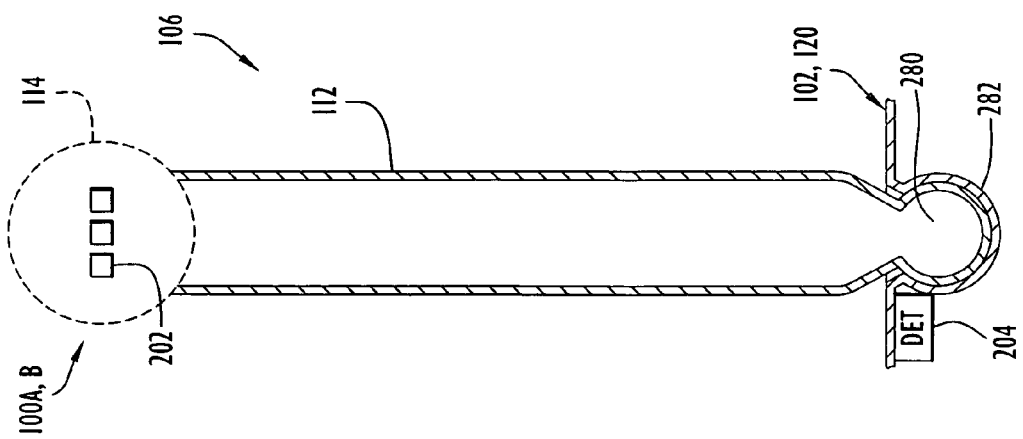
FIG. 4A is a view in elevation and partial section of the joystick of the user interface device of FIGS. 1 and 2 attached to the device base via a ball and socket arrangement and utilizing image processing techniques to determine joystick manipulation.

An alternative arrangement to measure joystick manipulation is illustrated in FIG. 4B. In particular, a set of potentiometers 208 are disposed within base 102, 120 proximate socket 282 with each potentiometer coupled to or in contact with ball 280. The potentiometers may be of any quantity, may be disposed at any suitable locations, and may be implemented by any conventional or other devices with any variable property (e.g., electrical, chemical, mechanical, resistance, capacitance, magnetic, etc.). When a user applies force to joystick 106, ball 280 rotates or slides within, and relative to, socket 280. Since ball 280 is coupled to potentiometers 208, this motion alters the resistance control of corresponding potentiometers 208 to adjust the potentiometer resistance. The altered resistances result in a voltage change that may be measured by control circuitry 50 (FIGS. 7A, 7B) to determine the amount of manipulation of the joystick. The control circuitry receives and processes the information from potentiometers 208 to update the game scenario in accordance with the forces applied to the joystick by a user.

The joystick manipulation may further be measured via switches as illustrated in FIG. 4C. In particular, a series of switches 214 are mounted in base 102, 120 proximate socket 282. Ball 280 and/or rod 112 may include contacts or actuating members 215 disposed on the exterior surface thereof, preferably coincident a corresponding switch 214. The switches and contacts are substantially similar to the switches and contacts described above, may be of any quantity and may be disposed at any suitable locations. When a user applies force to the joystick, ball 280 rotates or slides within, and relative to, socket 280, where one or more contacts 215 may actuate corresponding switches 214. The actuated switches each provide a signal to control circuitry 50 (FIGS. 7A, 7B). The particular switches actuated in response to manipulation of the joystick indicate the direction and motion of the joystick by the user. The control circuitry processes the information to update the game scenario in accordance with the forces applied to the joystick by a user.

Figure 4D:
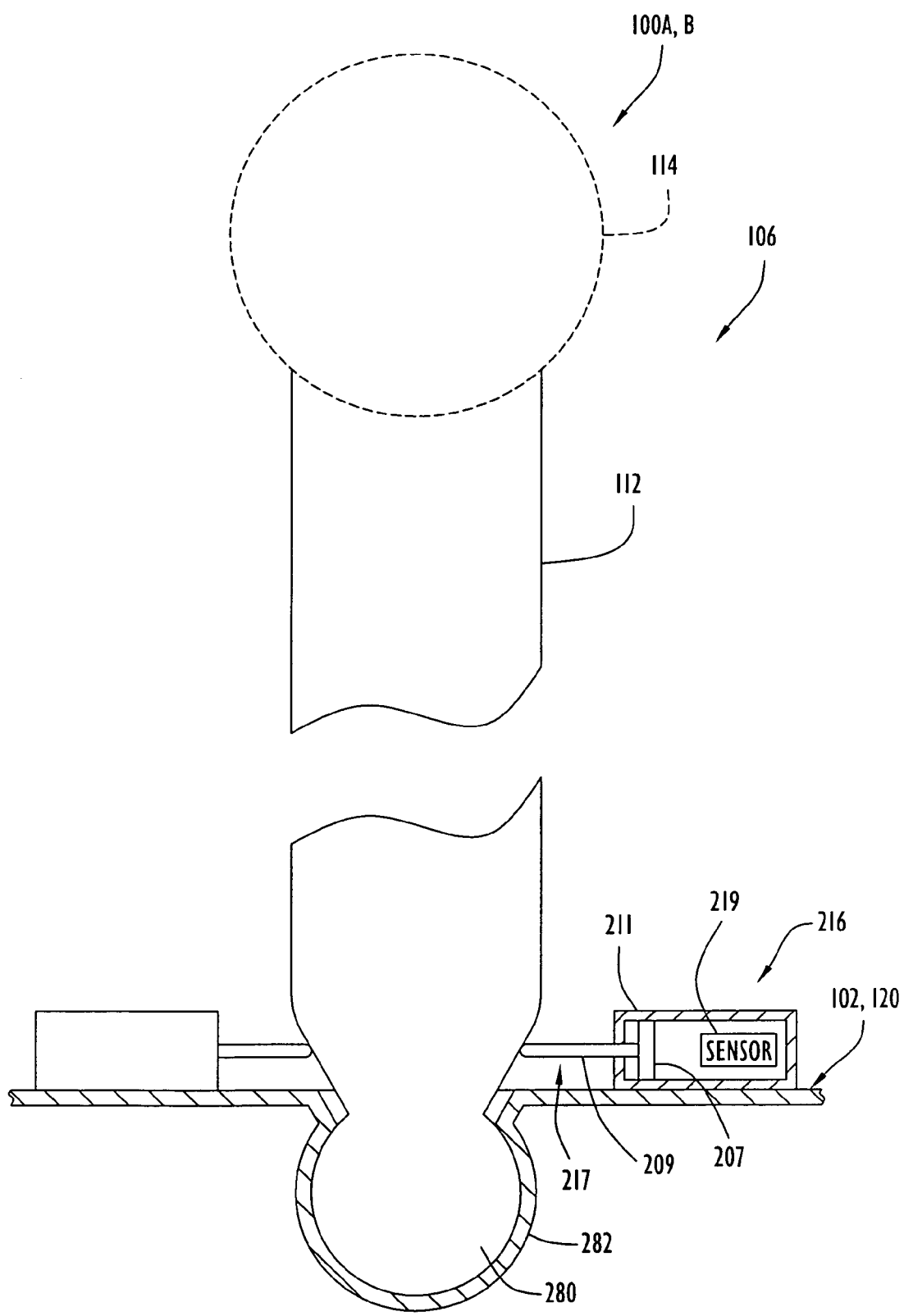
FIG. 4D is a view in elevation and partial section of the joystick of the user interface device of FIGS. 1 and 2 attached to the device base via a ball and socket arrangement and utilizing damper mechanisms disposed at the junction of the base and joystick to determine joystick manipulation.

Referring to FIG. 4D, the joystick manipulation may be measured by a series of linear damper mechanisms. In particular, a series of linear damper mechanisms 216 is mounted in base 102, 120 and around the periphery of the bottom tapered portion of rod 112. The damper mechanism is substantially similar to the damper mechanism described above and, by way of example, is in the form of a shock absorber including cylinder 211 and piston 217. The piston includes piston head 207 disposed within cylinder 211 and piston rod 209 coupled to head 207 and extending therefrom external of the cylinder as described above. Cylinder 211 is mounted to base 102, 120, while the distal end of piston rod 209 external of the cylinder is coupled to the lower tapered portion of rod 112. The piston is urged in a reciprocal motion within cylinder 211 in response to joystick motion. The damper mechanism further includes a resistance mechanism to impede the reciprocal motion of the piston within cylinder 211 as described above. The resistance mechanism may be in the form of a spring disposed within cylinder 211 and coupled to the piston, or in the form of pressurized fluid within the cylinder as described above.

Damper mechanism 216 further includes sensing device 219 to measure the amount of piston motion as described above. The sensing device may be coupled to the piston rod and/or head and may be implemented by any suitable sensors (e.g., encoders, potentiometers, etc.). When a user applies force to the joystick, piston rods 209 coupled to the joystick produce a reciprocal piston motion within corresponding cylinders. The positions (or amount and direction of motion) of the pistons within the damper mechanisms are measured by corresponding sensors 219. These measurements indicate joystick manipulation and are provided to control circuitry 50 (FIGS. 7A, 7B). The control circuitry processes the information to update the game scenario in accordance with the forces applied to the joystick by a user.

Figure 5B:
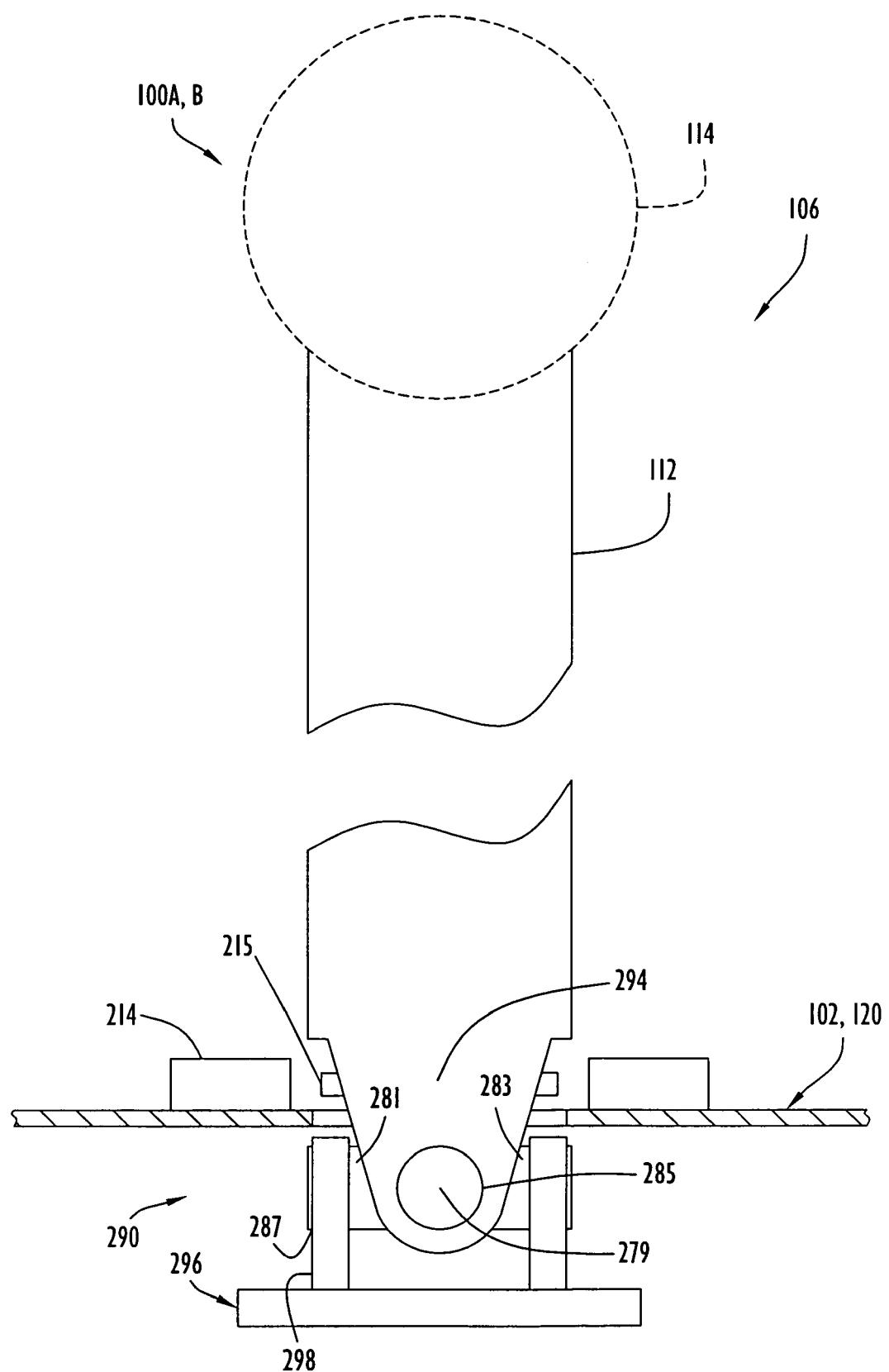
FIG. 5B is a view in elevation and partial section of the joystick of the user interface device of FIGS. 1 and 2 attached to the device base via a universal joint and utilizing switches disposed at the junction of the base and joystick to determine joystick manipulation.
Figure 5C:
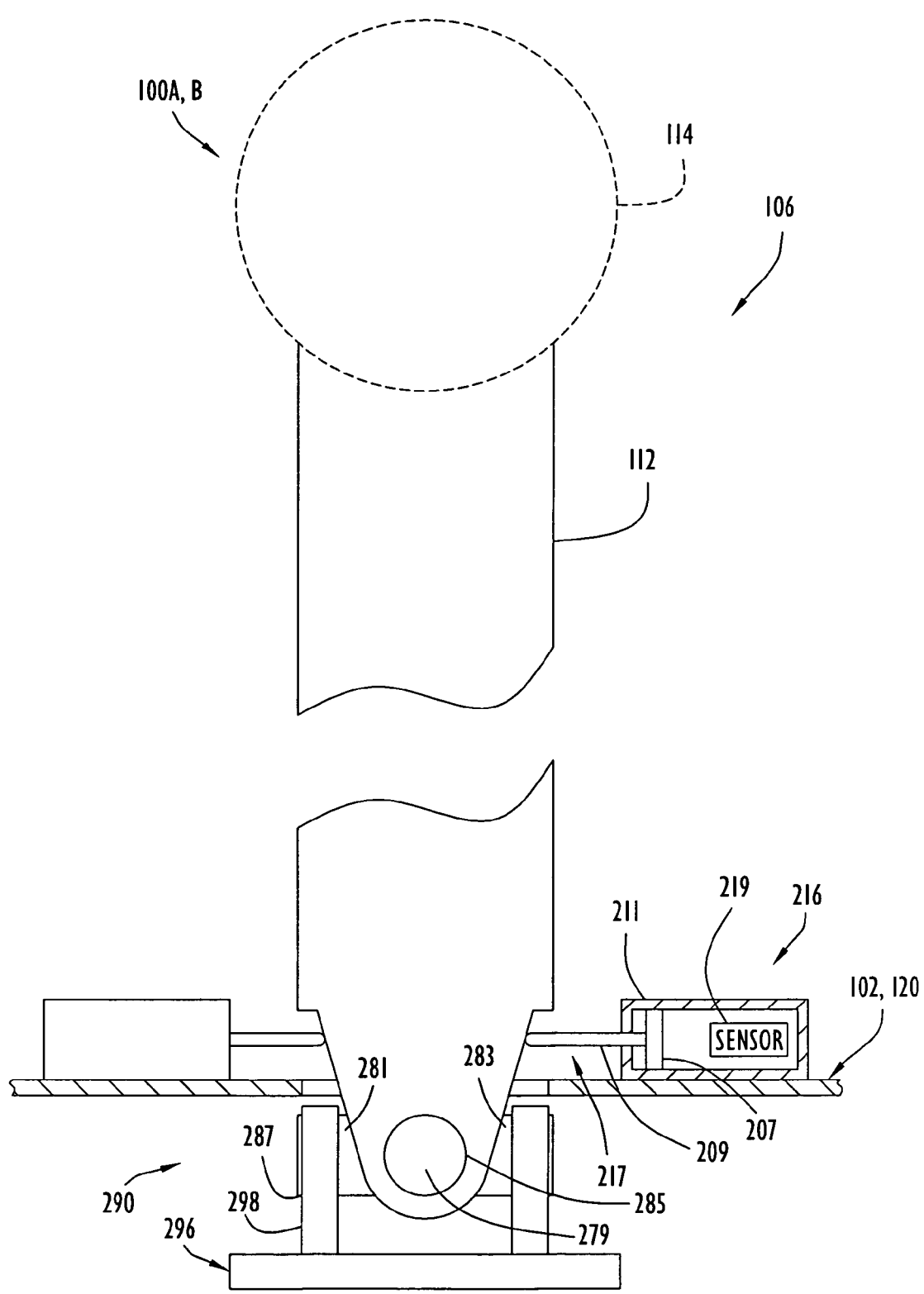
FIG. 5C is a view in elevation and partial section of the joystick of the user interface device of FIGS. 1 and 2 attached to the device base via a universal joint and utilizing damper mechanisms disposed at the junction of the base and joystick to determine joystick manipulation.

Joystick 106 may further be attached to base 102, 120 via a universal joint as illustrated in FIGS. 5A-5C. In particular, a universal joint 290 is disposed within base 102, 120 with rod 112 attached to the joint top surface. The universal joint may be implemented by any conventional or other coupling devices or mechanisms (e.g., joints, gimbals, etc.), such as the universal joints disclosed in U.S. Pat. No. 6,994,627 (Menosky et al.), the disclosure of which is incorporated herein by reference in its entirety. By way of example only, joint 290 includes a rod pivot member 292, a base pivot member 296 and a cross member 295 interconnecting the rod and pivot members. Rod pivot member 292 includes a pair of legs 294 attached to a substantially circular platform 291. The legs are angularly offset from each other by approximately one-hundred eighty degrees and each include an aperture 285 to receive cross member 295. Rod 112 is attached to the platform top surface.

Base pivot member 296 includes a pair of legs 298 attached to a generally circular platform 293. The legs are angularly offset from each other by approximately one-hundred eighty degrees and each include an aperture 287 to receive cross member 295. Base 102, 120 is coupled to the platform bottom surface in a manner enabling rotation of the base pivot member relative to the base. This rotational coupling may be implemented by any conventional or other techniques (e.g., spindle, axle, rollers, etc.). The rotational coupling of platform 293 to the base enables joystick 106 to attain any desired angular position. Rod pivot member 292 is disposed over base pivot member 296 with pairs of legs 294, 298 in facing relation and angularly offset by approximately ninety degrees. Cross member 295 interconnects the rod and base pivot members and includes a central hub 289 with projections 277, 279, 281, 283 extending therefrom. The projections are angularly offset from each other by approximately ninety degrees (e.g., projections 277, 279 are angularly offset from each other by approximately one-hundred eighty degrees with projections 281, 283 being offset from each other in a similar manner) to form a cross type configuration for the cross member. Projections 277, 279 are inserted within apertures 285 of rod pivot member legs 294 and enable the rod pivot member and joystick 106 to rotate about a first axis (e.g., a longitudinal axis through projections 277, 279). Projections 281, 283 are inserted within apertures 287 of base pivot member legs 298 and enable the rod pivot member and joystick 106 to rotate about a second axis (e.g., a longitudinal axis through projections 281, 283) orthogonal to the first axis. Thus, the universal joint enables the joystick to be manipulated along two orthogonal axes at any desired angular position.

Manipulation of joystick 106 and/or knob 114 in this type of configuration may be monitored in various manners with the interface device employing varying techniques to measure the joystick manipulation relative to the base. Referring to FIG. 5A, a set of potentiometers may be utilized to measure manipulation of joystick 106. In particular, potentiometers 208 may be disposed on base pivot member platform 293 and at least one leg 294, 298 of each of the base and rod pivot members. The leg potentiometers are coupled to the corresponding legs and/or cross member in a manner enabling rotation of the legs about the cross member to alter the resistance controls of those potentiometers. The platform potentiometer may be coupled to the platform and/or base in a manner enabling rotation of the platform relative to the base to alter the resistance controls of that potentiometer. The potentiometers may be of any quantity, may be disposed at any suitable locations, and may be implemented by any conventional or other devices with any variable property (e.g., electrical, chemical, mechanical, resistance, capacitance, magnetic, etc.). When a user applies force to joystick 106, the base pivot member may rotate relative to the base, while the rod pivot member may rotate about the first and/or second orthogonal axes. The base pivot member rotation alters the resistance controls of the corresponding potentiometer mounted to that platform to adjust the potentiometer resistance. Similarly, the rod pivot member rotation alters the resistance controls of the corresponding potentiometers mounted to the rod and base pivot member legs to adjust the resistances of those potentiometers. The altered resistances result in a voltage change that may be measured by control circuitry 50 (FIGS. 7A, 7B) to determine the amount of manipulation of the joystick. The control circuitry receives and processes the information from the potentiometers to update the game scenario in accordance with the forces applied to the joystick by a user.

The joystick manipulation may further be measured via switches as illustrated in FIG. 5B. In particular, a series of switches 214 are mounted in base 102, 120 proximate the lower portion of rod 112. The rod lower portion may include contacts or actuating members 215 disposed on the rod exterior surface, preferably coincident a corresponding switch 214. The switches and contacts are substantially similar to the switches and contacts described above, may be of any quantity and may be disposed at any suitable locations. When a user applies force to the joystick, the rod is moved in accordance with the applied force via universal joint 290, where one or more contacts 215 may actuate corresponding switches 214. The actuated switches each provide a signal to control circuitry 50 (FIGS. 7A, 7B). The particular switches actuated in response to manipulation of the joystick indicate the direction and motion of the joystick by the user. The control circuitry processes the information to update the game scenario in accordance with the forces applied to the joystick by a user.

Referring to FIG. 5C, the joystick manipulation may be measured by a series of linear damper mechanisms. In particular, a series of linear damper mechanisms 216 is mounted in base 102, 120 and around the periphery of the bottom portion of rod 112. The damper mechanism is substantially similar to the damper mechanism described above and, by way of example, is in the form of a shock absorber including cylinder 211 and piston 217. The piston includes piston head 207 disposed within cylinder 211 and piston rod 209 coupled to head 207 and extending therefrom external of the cylinder as described above. Cylinder 211 is mounted to base 102, 120, while the distal end of piston rod 209 external of the cylinder is coupled to the lower portion of rod 112. The piston is urged in a reciprocal motion within cylinder 211 in response to joystick motion. The damper mechanism further includes a resistance mechanism to impede the reciprocal motion of the piston within cylinder 211 as described above. The resistance mechanism may be in the form of a spring disposed within cylinder 211 and coupled to the piston, or in the form of pressurized fluid within the cylinder as described above.

Damper mechanism 216 further includes sensing device 219 to measure the amount of piston motion as described above. The sensing device may be coupled to the piston rod and/or head and may be implemented by any suitable sensors (e.g., encoders, potentiometers, etc.). When a user applies force to the joystick, piston rods 209 coupled to the joystick produce a reciprocal piston motion within corresponding cylinders. The positions (or amount and direction of motion) of the pistons within the damper mechanisms are measured by corresponding sensors 219. These measurements indicate joystick manipulation and are provided to control circuitry 50 (FIGS. 7A, 7B). The control circuitry processes the information to update the game scenario in accordance with the forces applied to the joystick by a user.

In addition, joystick 106 may attached to base 102, 120 via a sleeve arrangement as illustrated in FIGS. 6A-6D. In particular, base 102, 120 may include a substantially cylindrical stub 302. The stub includes transverse dimensions substantially the same as those of rod 112 of joystick 106. An elastic sleeve 304 (e.g., flexible material, spring, etc.) includes transverse dimensions slightly greater than those of stub 302 and rod 112. The sleeve may be disposed over the stub, where joystick 106 is disposed within sleeve 304 with the rod bottom portion residing in the stub. The longitudinal dimension of the sleeve is slightly less than those of rod 112 to enable knob 114 to reside external of the sleeve for manipulation by a user. Sleeve 304 may be replaced with sleeves constructed of materials with greater or less elasticity to adjust the amount of force required by a user to manipulate or deflect joystick 106.

Manipulation of joystick 106 and/or knob 114 within this type of configuration may be monitored in various manners with the interface device employing varying techniques to measure the joystick manipulation relative to the base. Referring to FIG. 6A, a camera or photodetector may be utilized to measure joystick manipulation in substantially the same manner described above. Specifically, camera or photodetector 204 may be mounted within stub 302 with knob 114 within the detector field of view through rod 112. Passive colored patterns or active light emitting or other illuminating devices 202 (e.g., LEDs, etc.) may be placed at the other end of rod 112 toward knob 114. The photodetector and light emitting devices are substantially similar to the devices described above and may be disposed at any suitable locations. Detector 204 captures images of the field of view, where the patterns or emitted light are displaced within the captured image due to manipulation or deflection of the joystick by a user.

Interface device processor 52, 62 (FIGS. 7A, 7B) may include image recognition software to process the captured images and determine the amount of deflection or manipulation of joystick 106 by the user based on the displaced patterns or emitted light in the resulting image as described above. For example, the pattern or arrangement of emitted light may be in a certain area (e.g., substantially centered, etc.) within the detector field of view when the joystick is in a reference position (e.g., centered, etc.). This or a previously captured image may serve as a reference image. However, when a user applies force to joystick 106, the pattern or emitted light arrangement shifts within the field of view in accordance with joystick motion and is displaced within the resulting image. The newly captured image may be compared to the reference image via conventional image processing techniques as described above to determine the amount of displacement of the pattern or emitted light arrangement within the image. This displacement is proportional to the amount of joystick manipulation (e.g., direction, distance of joystick motion, etc.). The processor processes the captured image to determine the joystick manipulation and updates the game scenario in accordance with the forces applied to the joystick by a user.

An alternative arrangement to measure joystick manipulation via strain gauges is illustrated in FIG. 6B. In particular, strain gauge sensors 210, 212 may be arranged at suitable locations on the stub interior surface. These sensors measure the amount of a strain deformation applied to the stub as a result of the user applying pushing, pulling or lateral forces to the joystick. By way of example only, sensor 212 may measure forces along a stub X-axis (e.g., lateral or left/right forces), while sensor 210 may measure forces along a stub Y-axis (e.g., push/pull or forward/backward forces). The strain gauge sensors may be arranged with respect to the stub and/or joystick in any suitable manner to measure forces, such as the manners disclosed in the aforementioned patent applications. For example, the strain gauge sensors may be attached directly or indirectly to a stub and/or joystick exterior or interior surface to measure the applied forces. The resistance of the strain gauge sensors is measured to determine deflection or manipulation of the joystick as described above. The strain gauge sensors are connected to control circuitry 50 (FIGS. 7A, 7B) that processes the information to update the game scenario in accordance with strain forces applied to the joystick by a user.

The joystick manipulation may further be measured via switches as illustrated in FIG. 6C. In particular, a series of switches 214 is mounted in base 102, 120 proximate the stub periphery. The stub may include contacts or actuating members 215 disposed on the stub exterior surface, preferably coincident a corresponding switch 214. The switches and contacts are substantially similar to the switches and contacts described above, may be of any quantity and may be disposed at any suitable locations. When a user applies force to the joystick, the applied forces deflect stub 302, where one or more contacts 215 of the stub may actuate corresponding switches 214. The actuated switches each provide a signal to control circuitry 50 (FIGS. 7A, 7B). The particular switches actuated in response to manipulation of the joystick indicate the direction and motion of the joystick by the user. The control circuitry processes the information to update the game scenario in accordance with the forces applied to the joystick by a user.

Figure 6D:
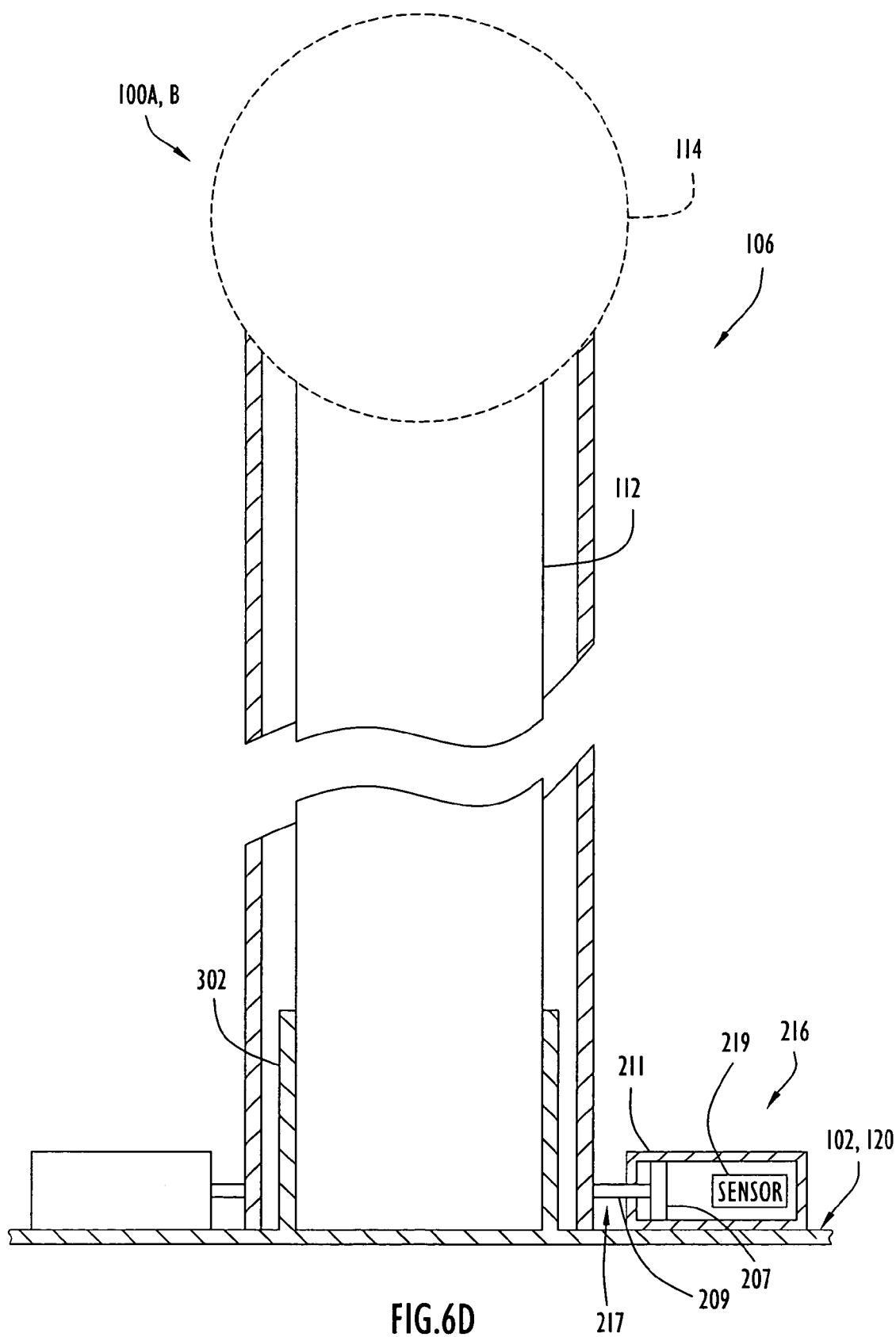
FIG. 6D is a view in elevation and partial section of the joystick of the user interface device of FIGS. 1 and 2 attached to the device base via a sleeve arrangement and utilizing damper mechanisms disposed at the junction of the base and joystick to determine joystick manipulation.

Referring to FIG. 6D, the joystick manipulation may be measured by a series of linear damper mechanisms. In particular, a series of linear damper mechanisms 216 is mounted in base 102, 120 and around the periphery of sleeve 304. The damper mechanism is substantially similar to the damper mechanism described above and, by way of example, is in the form of a shock absorber including cylinder 211 and piston 217. The piston includes piston head 207 disposed within cylinder 211 and piston rod 209 coupled to head 207 and extending therefrom external of the cylinder as described above. Cylinder 211 is mounted to base 102, 120, while the distal end of piston rod 209 external of the cylinder is coupled to the lower portion of sleeve 304. The piston is urged in a reciprocal motion within cylinder 211 in response to joystick motion. The damper mechanism further includes a resistance mechanism to impede the reciprocal motion of the piston within cylinder 211 as described above. The resistance mechanism may be in the form of a spring disposed within cylinder 211 and coupled to the piston, or in the form of pressurized fluid within the cylinder as described above.

Damper mechanism 216 further includes sensing device 219 to measure the amount of piston motion as described above. The sensing device may be coupled to the piston rod and/or head and may be implemented by any suitable sensors (e.g., encoders, potentiometers, etc.). When a user applies force to the joystick, piston rods 209 coupled to the sleeve produce a reciprocal piston motion within corresponding cylinders. The positions (or amount and direction of motion) of the pistons within the damper mechanisms are measured by corresponding sensors 219. These measurements indicate joystick manipulation and are provided to control circuitry 50 (FIGS. 7A, 7B). The control circuitry processes the information to update the game scenario in accordance with the forces applied to the joystick by a user.

The level of exertion required by a user in order to achieve a particular response in the video game scenario may be adjusted in various manners within the above configurations for interface device 100a, 100b. For example, the level of exertion required by a user may be adjustable by changing damping or elastic characteristics. In particular, a sleeve may be positioned over rod 112 and firmly attached to base 102, 120, where the position and rigidity of the sleeve may be adjusted to alter the force required by a user. Further, the quantity of sleeves employed over the rod may be altered to adjust the force required by a user (e.g., the greater the quantity of sleeves, the greater the force required by a user). Moreover, an elastic material (e.g., a spring, rubber elastomer, etc.) may be compressed between the base and joystick 106. In addition, the flow of fluid to linear damper mechanisms 216 (e.g., shock absorbers, etc.) may be controlled to alter the damper resistance and force required by a user. Alternatively, the positions of the linear damper mechanisms may be adjusted relative to the joystick to alter the leverage and, hence, the force required by a user.

The resistance levels may further be adjusted by processor 52, 62 (FIGS. 7A, 7B) during processing of the various measurements as described below. These measurements may be weighted or amplified during processing, where greater or less force may need to be applied by a user to overcome the weighting (e.g., the greater the weight applied, the less force required by a user). Resistance levels (e.g., for the processor, fluid control, etc.) may be entered by a user via dial 118 or resistance input devices 156 as described above. Alternatively, or in combination with user input, the resistance levels may be controlled by control circuitry 50 based upon conditions within the video game scenario, such as changing wind conditions, changing grade of the terrain (e.g., going uphill), etc.

Exemplary control circuitry for interface device 100a, 100b configured to include and execute gaming applications is illustrated in FIG. 7A. Specifically, control circuitry 50 is preferably disposed or housed within base 102, 120 and includes processor 52 coupled to the particular sensors and input mechanisms described above (e.g., strain gauges 210, 212, switches 214, potentiometers 208, photodetector 204, damper sensors 219, input devices or buttons 110, 116, 124, 156, etc.) depending upon the particular configuration employed. A conventional power supply (not shown) provides appropriate power signals to each of the control circuitry components as necessary. The interface device may be powered by a battery and/or any other suitable power source (e.g., wall outlet, etc.). A power switch (not shown) may further be included to activate the circuit components.

The signals from the various sensors and input mechanisms are transmitted to a respective predetermined memory location within processor 52. The processor may be implemented by any conventional or other processor and may include circuitry to and/or convert analog signals from the various devices to digital values for processing. The processor samples the memory locations at predetermined time intervals (e.g., preferably on the order of ten milliseconds or less) to continuously process information (e.g., determine input mechanism manipulation, determine joystick manipulation, etc.) to update and/or respond to an executing gaming application. The processor may process raw digital values in any fashion to account for various calibrations or to properly adjust the values within quantization ranges for digitized analog signals.

The processor receives the measurements from the various sensors (e.g., and/or other information from input devices 110, 116, 124) to determine joystick and input mechanism manipulation. The processor may provide various information for display to a user (e.g., the amount of work performed by the user during a particular exercise session, a game scenario, time or elapsed time and/or any other exercise or game related information) on monitor 300 and/or another local or remote display (not shown). In particular, the processor may receive signals from strain gauges 210, 212 and determine the amount of joystick manipulation or deflection along the axes associated with the strain gauges to update a game scenario. The processor may receive signals from switches 214, where the switch signals may be in the form of a digital word with each bit indicating the status of a corresponding switch. The processor identifies the particular switches that have been actuated to determine the joystick manipulation (e.g., based on the actuated switch location) to update the game scenario. Further, the processor may receive signals from various potentiometers 208 indicating a change in their resistance (e.g., due to rod deflection, motion of the ball within the socket, motion of the universal joint, etc.) to determine the amount of joystick manipulation or deflection to update a game scenario. Moreover, the processor may receive signals from sensors 219 of the damper mechanisms indicating the piston position or motion to determine the amount of joystick manipulation or deflection to update a game scenario.

In addition, the processor may receive captured images from photodetector or camera 204. In this case, the processor may include image recognition software to process the captured images and determine the amount of deflection or manipulation of the joystick by the user based on displaced patterns or emitted light in the resulting image as described above. For example, a pattern or arrangement of emitted light may be within a certain area in the detector field of view in the absence of joystick deflection or manipulation. This or a previously captured image may serve as a reference image. However, when a user applies force to joystick 106, the pattern or emitted light arrangement shifts within the field of view in accordance with joystick motion and is displaced within the resulting image. The newly captured image may be compared to the reference image via conventional image processing techniques to determine the amount of displacement of the pattern or emitted light arrangement within the image (e.g., indicating the amount of joystick manipulation or deflection). The processor processes the captured image to determine the joystick manipulation or deflection and updates the game scenario in accordance with the forces applied to the joystick by a user.

The processor may further control resistance levels required by the user to interact with the game scenario in accordance with settings provided by dial 118 and/or resistance input devices 156. For example, the processor may apply weights to the sensor measurements. These weights may be based on information entered by the user. Since greater measurement values correspond to a greater force, increasing the weight values enables a user to exert less force to achieve a particular force value, thereby effectively lowering the resistance of the interface device for the user. Conversely, reducing the weight value requires a user to exert greater force to achieve the particular force value, thereby increasing the resistance of the interface device for the user.

Processor 52 includes and executes gaming software. In particular, the processor processes the received signals and updates the executing gaming scenario in accordance with manipulation of the joystick and/or input mechanisms (e.g., devices or buttons 116, 124). The processor may include, or be coupled to, an audio/visual (A/V) module 56 that generates signals (e.g., video, audio, etc.) for transference from interface device 100a, 100b directly to monitor 300. The A/V module may be implemented by any conventional or other processing system or circuitry (e.g., video processor, digital signal processor (DSP), etc.) providing audio and/or video signals. The signals may be provided to the monitor via cable 270 (FIGS. 1-2) connected to and extending from the base or any other suitable location. The cable may be implemented by any conventional or other cable suitable to transfer video and/or audio signals. By way of example, a user may connect the interface device directly to a television set or other monitor through either an RF connector (e.g., via channels three or four), or through the monitor audio/visual ports (e.g., via RCA type connectors, etc.). In addition, the processor performs a reset or reboot operation in response to actuation of reset button 110.

The user interface device may further include communication ports 54 within control circuitry 50 and be coupled to or networked with other user interface devices to enable plural users to compete against each other in a game scenario as described below. The communication ports may be of any quantity, may transmit and/or receive information, and may be implemented by any conventional or other communication ports (e.g., serial or USB, parallel, wired, wireless, Bluetooth, etc.). Processor 52 is coupled to the communication ports and receives information from the other user interface devices, preferably indicating desired actions from other users (e.g., manipulation of joystick 106 and/or other input devices, etc.). The processor processes the received information to update the game scenario in accordance with the user actions for display on monitor 300. In addition, the processor may further provide information indicating desired actions of a user (e.g., manipulation of joystick 106 and/or other input devices, etc.) to communication ports 54 for transmission to other user interface devices.

Exemplary control circuitry for interface device 100a, 100b configured to serve as a game controller for game processor 200 is illustrated in FIG. 7B. Specifically, control circuitry 50 is preferably disposed or housed within base 102, 120 and includes processor 62 coupled to the particular sensors and input mechanisms described above (e.g., strain gauges 210, 212, switches 214, potentiometers 208, photodetector 204, damper sensors 219, input devices or buttons 110, 116, 123, 124, 156, joystick 121, etc.) depending upon the particular configuration employed. A conventional power supply (not shown) provides appropriate power signals to each of the control circuitry components as necessary. The interface device may be powered by a battery and/or any other suitable power source (e.g., wall outlet, game processor, etc.). A power switch (not shown) may further be included to activate the circuit components.

The signals from the various sensors and input mechanisms are transmitted to a respective predetermined memory location within processor 62. The processor is similar to processor 52 described above, may be implemented by any conventional or other processor, and may include circuitry to and/or convert analog signals from the various devices to digital values for processing. Processor 62 samples the memory locations at predetermined time intervals (e.g., preferably on the order of ten milliseconds or less) to continuously process information (e.g., determine input mechanism manipulation, determine joystick manipulation, etc.) to update and/or respond to an executing gaming application on game processor 200. Processor 62 may process raw digital values in any fashion to account for various calibrations or to properly adjust the values within quantization ranges for digitized analog signals.

Processor 62 receives the measurements from the various sensors (e.g., and/or other information from input devices 110, 116, 121, 123, 124) to determine joystick and input mechanism manipulation, and may provide various information for display to a user (e.g., the amount of work performed by the user during a particular exercise session, a game scenario, time or elapsed time and/or any other exercise or game related information) on monitor 300 and/or another local or remote display (not shown) in substantially the same manner described above. Further, the processor may receive captured images from photodetector or camera 204 and may include image recognition software to process the captured images and determine the amount of deflection or manipulation of the joystick by the user based on displaced patterns or emitted light in the resulting image as described above. In addition, the processor performs a reset or reboot operation in response to actuation of reset button 110.

In order to enhance performance of the interface device as a peripheral to the game processor, the responsiveness of the interface device may be adjusted to permit small amounts of rod deflection or manipulation to result in meaningful input to the game processor. This enables the user to be competitive in the game scenario, where user responses or reactions to the game may be delayed due to the physical exertion required to enter desired actions for the game on the interface device. For example, the measurements may be amplified by amplification devices or circuitry (e.g., an amplifier 203 may be disposed between strain gauges 210, 212 and processor 62), or the processor may apply weights to the measurements as described above. The processor may further control resistance levels required by the user to interact with the game scenario in accordance with settings provided by dial 118 and/or resistance input devices 156 as described above. For example, the processor may apply weights to the sensor measurements based on information entered by the user as described above.

Processor 62 processes and arranges the received signals into suitable data packets for transmission to game processor 200. The data packets are in a format resembling data produced by a standard peripheral device (e.g., game controller, etc.). For example, the processor may construct a data packet for a game processor (e.g., PS2, XBOX, GAMECUBE, personal computer, etc.) that includes the status of all interface device input mechanisms (e.g., buttons 116, 124, etc.) and the processed values from each sensor. By way of example only, the data packet may include header information, X-axis information indicating a measurement for joystick 106 and/or 121 along this axis, Y-axis information indicating a measurement for joystick 106 and/or 121 along this axis, rudder or steering information, throttle or rate information and additional information relating to the status of input mechanisms (e.g., buttons, supplemental joystick, etc.). Additional packet locations may be associated with data received from other input mechanisms connected with the processor, where the input mechanisms represent additional operational criteria for the scenario (e.g., the firing of a weapon in the scenario when the user presses an input button, throttle, etc.). The game processor processes the information or data packets in substantially the same manner as that for information received from a conventional peripheral (e.g., game controller, etc.) to update and/or respond to an executing gaming application (e.g., game, etc.).

In addition, joysticks 106, 121 and the input mechanisms may be selectively configured or assigned to game functions. In particular, processor 62 may generate the data packets for the game processor in accordance with controls from switch controls 157. In this case, measurements from the various sensors or input mechanisms (e.g., joysticks 106, 121, input devices or buttons 116, 123, 124, etc.) are placed in data packet locations corresponding to the desired functions indicated by input devices 157. For example, if the user desires joystick 106 to control steering, the measurements for joystick 106 are placed in the data packet location the game processor expects to receive steering information. Other functions may be associated with input mechanisms in a similar manner. The game processor processes the information or packets as described above to update and/or respond to an executing gaming application (e.g., game, etc.).

Alternatively, joysticks 106, 121 and the input mechanisms may be selectively configured or assigned to game functions via a switching device 158 as described in the aforementioned patent applications. In this case, switching device 158 receives the signals from the various sensors and input mechanisms and is coupled to switch controls 157 and processor 62. Switching device 158 enables a user to selectively configure the interface device for game functions as described below. By way of example only, joystick 106 (FIGS. 1-2) serves as a right controller joystick, while joystick 121 serves as the left controller joystick, where the functions of the joysticks with respect to a game may be selectively assigned by a user as described below. However, joystick 106 may serve as any joystick or other input device.

The switching device receives information from the sensors and input mechanisms, and is coupled to the inputs of processor 62. The switching device basically enables information for input mechanisms to be selectively placed on the processor inputs corresponding to the desired game functions. The processor inputs are typically mapped to game functions in accordance with the game software executed by game processor 200. The switching device basically couples the signals from the desired devices (e.g., joysticks 106, 121, buttons 110, 116, 123, 124, etc.) to the processor inputs corresponding to the desired game functions in accordance with controls from a user entered via switch controls 157. Applications of high complexity with respect to blending or assigning game functions may require additional selector switches and various combinations of selector switch settings. For example, joystick 106 may individually perform the functions of two joysticks in accordance with the connections, such as accelerator and steering functions. In this case, application of a forward force to joystick 106 may serve as the accelerator, while lateral force applied to joystick 106 may serve as the steering function.

Switching device 158 may be implemented by any quantity of any conventional or other devices capable of switching signals (e.g., switches, multiplexers, cross-bar switch, analog switches, digital switches, routers, logic, gate arrays, logic arrays, etc.) to accomplish the function assignments for the interface device. The signals from the switching device outputs are transmitted to a respective predetermined memory location within processor 62 as described above. The signal processor samples the memory locations at predetermined time intervals to continuously process and send information to the game processor to update and/or respond to an executing gaming application as described above.

The interface device may serve as a game controller that is operable with a wide variety of video game processors or other systems including PS2, XBOX and GAMECUBE systems, and various personal or other computers (e.g., personal computers with Microsoft WINDOWS and Apple Mac OS X operating systems). Interface device 100a, 100b includes a cable system that facilitates connection and communication between the interface device and multiple (e.g., two or more) video game processors. Referring back to FIGS. 1-2, cable system 220 is connected to and extends from base 102, 120. Cable system 220 is substantially similar to the cable system described in aforementioned U.S. patent application Ser. No. 11/097,370 and includes a flexible and hollow body 224 that extends into base 102, 120 to receive and retain wiring that is connected with processor 62 (FIG. 7B) within the base. Alternatively, the cable may connect with the interface device at any other suitable location and/or in any other suitable manner. A number of separately and independently extending wires are sheathed within and extend the length of cable body 224. The wires are configured for providing an electrical contact or link between processor 62 and a specific video game processor as described below.

Cable body 224 extends a selected distance from interface device 100a, 100b and connects with a generally rectangular housing 226. A number of flexible and hollow cables 227, 230, 240, 250 extend from housing 226. The wiring within cable body 224 extends within housing 226 for transfer of signals to wiring sets directed into and through a respective one of the output cables 227, 230, 240, 250. Thus, housing 226 serves as a junction location for the transfer of signals between wiring within cable body 224 and respective wiring sets of the output cables, where each output cable includes a wiring set that is configured for connection to a game controller port of a corresponding video game processor.

Each output cable 227, 230, 240, 250 terminates in a respective connection plug 228, 231, 241, 251. The connection plugs are each configured to connect with a corresponding game controller port of a respective video game processor. The connection plugs connect with the game controller ports in a male-female mating relationship. In particular, each connection plug includes a male component with associated metal pins and/or other contacting structure that is configured for insertion into a corresponding female component of a respective controller port. These connections establish an electrical contact between the wiring set associated with the connection plug and corresponding wiring that connects in a suitable manner with the video game processor. By way of example only, connection plug 251 is configured to connect with a game controller port of a GAMECUBE system, connection plug 241 is configured to connect with a game controller port of an XBOX system, connection plug 231 is configured to connect with a game controller port of a PS2 system, and connection plug 228 is configured to connect with a universal serial bus (USB) port of any suitable gaming system or personal or other computer (e.g., to facilitate control of Microsoft WINDOWS or Apple Mac OS X based gaming or other applications). However, the cable system is not limited to this exemplary configuration, but rather can include any suitable number (e.g., two or more) of connection plugs of any suitable types and configurations to facilitate connections with any types of video game processors or other systems.

Cable system 220 is of a suitable length (e.g., eight feet or greater) to facilitate a relatively easy connection between interface device 100a, 100b and video game processor 200. In situations where the interface device is located a considerable distance (e.g., greater than eight feet) from a video game processor, the interface device may employ an extension cable device 350. Cable device 350 is substantially similar to the extension cable device disclosed in aforementioned U.S. patent application Ser. No. 11/097,370, and is coupled to cable system 220 to connect the cable system with the video game processor. In particular, extension cable device 350 includes a flexible and hollow cable 312 that extends a suitable length (e.g., about 8 feet or greater) and includes a first housing 316 at a first end of the cable and a second housing 328 at a second end of the cable. Cable 312 is substantially similar in configuration and design as cable 224 of cable system 220, where the same or substantially similar wiring extends through the cable. Further, cable 312 can include one or more wires that transfer common or shared signals for two or more wiring sets.

Each housing 316, 328 is substantially similar in configuration and design as housing 226 of cable system 220. Each housing serves as a junction location to transfer signals between the wiring within cable 312 and each of a plurality of wiring sets in a similar manner as described above for housing 226. In particular, a number of flexible and hollow cables 303, 306, 308, 310 extend from housing 316. The housing is disposed between cable 312 and these cables to facilitate a connection. Each cable 303, 306, 308, 310 couples a respective wiring set therein to housing 316 and terminates at a respective connection plug 305, 307, 309, 311. The housing transfers signals between the wiring sets and the appropriate wiring in cable 312, where one or more of the wires of cable 312 may convey signals common to the game processors to reduce the quantity of wires employed by the cable.

Connection plugs 305, 307, 309, 311 are complimentary with and configured for connection to corresponding connection plugs 227, 231, 241, 251 of cable system 220. In addition, the wiring sets disposed within the connection plugs of extension cable device 350 include the same or substantially similar wiring as the wiring sets disposed within the corresponding connection plugs of cable system 220. The connection plugs of the cable system and extension device connect with each other in a male-female mating relationship, where a male component of each connection plug of cable system 220 is inserted into a female component of a corresponding connection plug of extension cable device 350. This achieves an electrical contact between metal elements (e.g., pins and corresponding receiving receptacles and/or other metal complimentary contacting structures) of the plugs that further facilitates an electrical connection between the corresponding pairs of wiring sets extending within the cable system and the extension cable device. However, any other suitable connection between the connection plugs can be provided to facilitate electrical contact between corresponding pairs of wiring sets.

A number of flexible and hollow cables 320, 322, 324, 326 extend from housing 328. The housing is disposed between cable 312 and these cables to facilitate a connection. Each cable 320, 322, 324, 326 couples a respective wiring set therein to housing 328 and terminates at a respective connection plug 321, 323, 325, 327. The housing transfers signals between the wiring sets and the appropriate wiring in cable 312, where one or more of the wires of cable 312 may convey signals common to the game processors to reduce the quantity of wires employed by cable 312 as described above. Connection plugs 321, 323, 325, 327 are identical in configuration and design as corresponding connection plugs 227, 231, 241, 251 of cable system 220. Thus, each connection plug 321, 323, 325, 327 of the extension cable device includes a male component with associated metal pins and/or other metal contacting structure that is configured for insertion into a corresponding female component of a respective controller port to establish an electrical contact between the wiring set associated with the connection plug and corresponding wiring of the video game processor to which the connection plug is connected.

The sets of wiring that are directed to each connection plug 321, 323, 325, 327 of the extension cable device are further the same or substantially similar as the wiring sets of a corresponding connection plugs of cable system 220. Thus, the mapping of wiring sets through cable system 220 to the various connection plugs is maintained by extension cable device 350 to facilitate an extension of the various wiring sets a suitable distance for providing communication between interface device 100*a*, 100*b* and video game processor 200. In addition, it is noted that extension cable device 350 can also be utilized with any video game processor and corresponding game controller that include connecting components corresponding with any of the connection plug sets provided on the extension cable device. This enables the extension cable device to serve as a universal extension cable for a variety of different connection plug/port designs that exist for different video game processors and game controllers.

Control circuitry 50 of interface device 100*a*, 100*b* is configured for effective communication and operability as a game controller with each of the video game processors associated with the wiring sets and cable connectors of the cable system. In particular, when cable system 220 (optionally including extension cable device 350) is connected with a video game processor in the manner described above, processor 62 identifies the specific video game processor with which the interface device is connected upon receiving one or more initial electrical signals (e.g., one or more "wake-up" signals) from the video game processor. When the specific video game processor is identified, processor 62 processes and arranges signals into suitable data packets for transmission to and recognition by the video game processor during a gaming application as described above.

Operation of interface device 100*a*, 100*b* configured to include and execute gaming applications is described with reference to FIGS. 1-2 and 7A. Initially, a user couples the interface device to monitor 300 via cable 270 as described above. Interface device 100*a* may be placed on an appropriate surface (e.g., floor, chair, etc.), where the user is typically seated on base 102 with joystick 106 disposed between the user legs. Interface device 100*b* is similarly placed on an appropriate surface (e.g., floor, etc.) with the user standing on base 120. Since the user is sitting or standing on the interface device, the forces applied to joystick 106 form a closed loop and the base remains stable. In other words, the user body or weight provides sufficient resistive or stabilizing forces for the joystick to enable manipulation by the user. This is profoundly different from a conventional joystick that is typically unstable and quite easy to upset.

A game is selected (e.g., via joystick 121 and/or buttons 116, 124) and executed, where the user manipulates joystick 106 to interact with the game displayed on monitor 300. The user may further manipulate other input mechanisms (e.g., input devices 116, 124, etc.) for additional actions. The signals from the various sensors and input mechanisms (e.g., buttons 116, 124, etc.) are transmitted to processor 52 to update the executing gaming application and scenario as described above. Thus, the forces applied by the user to joystick 106 to interact with the game scenario require physical exertion and result in a corresponding coordinate movement or action in the game scenario displayed on monitor 300.

Operation of interface device 100*a*, 100*b* configured to serve as a game controller for game processor 200 is described with reference to FIGS. 1-2 and 7B. Initially, a user couples the interface device to video game processor 200 utilizing the appropriate connection plug or plugs of cable system 220 and/or extension cable device 350 (e.g., the particular connection plug or plugs compatible with the game processor). In accordance with the video gaming system utilized and/or the particular gaming application that is to be executed, the user may selectively assign game functions to joysticks 106, 121 and input devices 116, 123, 124 as described above. Further, during an initial set-up sequence (e.g., when the video game processor is powered on), processor 62 (FIG. 7B) receives one or more initial signals from video game processor 200. Processor 62 identifies the specific video game processor based on those initial signals and arranges data in suitable data packets for recognition by the identified game processor.

Interface device 100*a* may be placed on an appropriate surface (e.g., floor, chair, etc.), where the user is typically seated on base 102 with joystick 106 disposed between the user legs. Interface 100*b* is similarly placed on an appropriate surface (e.g., floor, etc.) with the user standing on base 120. Since the user is sitting or standing on the interface device, the forces applied to joystick 106 form a closed loop and the base remains stable. In other words, the user body or weight provides sufficient resistive or stabilizing forces for the joystick to enable manipulation by the user as described above.

A game is selected and executed (e.g., via joysticks 106, 121 and/or input devices 116, 123, 124, etc.), where the user manipulates joystick 106 to interact with the game. The user may further manipulate joystick 121 and other input mechanisms (e.g., input devices 116, 123, 124, etc.) for additional actions. The signals from the various sensors and input mechanisms (e.g., joystick 121, buttons 116, 123, 124, etc.) are transmitted to processor 62 to generate data packets for transference to video game processor 200. The game processor processes the information or data packets in substantially the same manner as that for information received from a conventional peripheral (e.g., game controller, etc.) to update and/or respond to an executing gaming application. Thus, the force applied by the user to joystick 106 to interact with the game scenario requires physical exertion and results in a corresponding coordinate movement or action in the scenario displayed on monitor 300 in accordance with the function assigned to that joystick by the user. In other words, user physical exertion is required to manipulate joystick 106 and indicate desired user actions or movements to the game processor to update movement or actions of characters or objects within the game in accordance with the function assigned to that joystick. For example, when the user assigns joystick 106 accelerator and steering functions, application of a forward force to joystick 106 may serve as the accelerator, while lateral force applied to joystick 106 may serve as the steering function.

As noted above, a single processor 62 is implemented in control circuitry 50 of user interface device 100*a*, 100*b* configured to serve as a game controller, where processor 62 is capable of communicating with a number of different video game processors in the manner described above. However, the present invention is not limited to the use of a single processor. Rather, the user interface device may include multiple processors (e.g., two or more), where each processor is configured to enable communication of signals between the user interface device and at least one corresponding video game processor as disclosed in the aforementioned patent applications. In addition, the electrical connection and/or communication between the one or more processors of the user interface device are not limited to the cable system and extension cable device described above. Rather, any suitable wired and/or wireless communication links can be provided that facilitate communication between one or more processors of the user interface device of the present invention and two or more different video game processors as disclosed in the aforementioned patent applications.

User interface device 100a, 100b configured to include and execute gaming applications may provide basic networking between plural interface devices. By way of example and referring to FIG. 8, a local area network (LAN) may be formed by coupling plural user interface devices 100a, 100b together using a simple interface (e.g., serial or USB, etc.) via communication ports 54 (FIG. 7A). This enables plural users to compete against each other in a game scenario. The connection may be accomplished via a cable or a wireless connection (e.g., Bluetooth, etc.). The network may include any quantity of user interface devices 100a, 100b arranged in a ring type configuration, where each user interface device 100a, 100b is coupled to a corresponding monitor 300 and to an adjacent user interface device. In this case, processor 52 of the user interface devices receive information from, and transmit information to, the other user interface devices in a daisy chain fashion via communication ports 54. The transmitted and received information preferably indicates desired actions of the users (e.g., manipulation of joystick 106 and/or other input mechanisms, etc.). The processor of each user interface device processes the information received from the other interface devices to update the game scenario in accordance with the user actions for display on a corresponding monitor 300.

Figure 9:
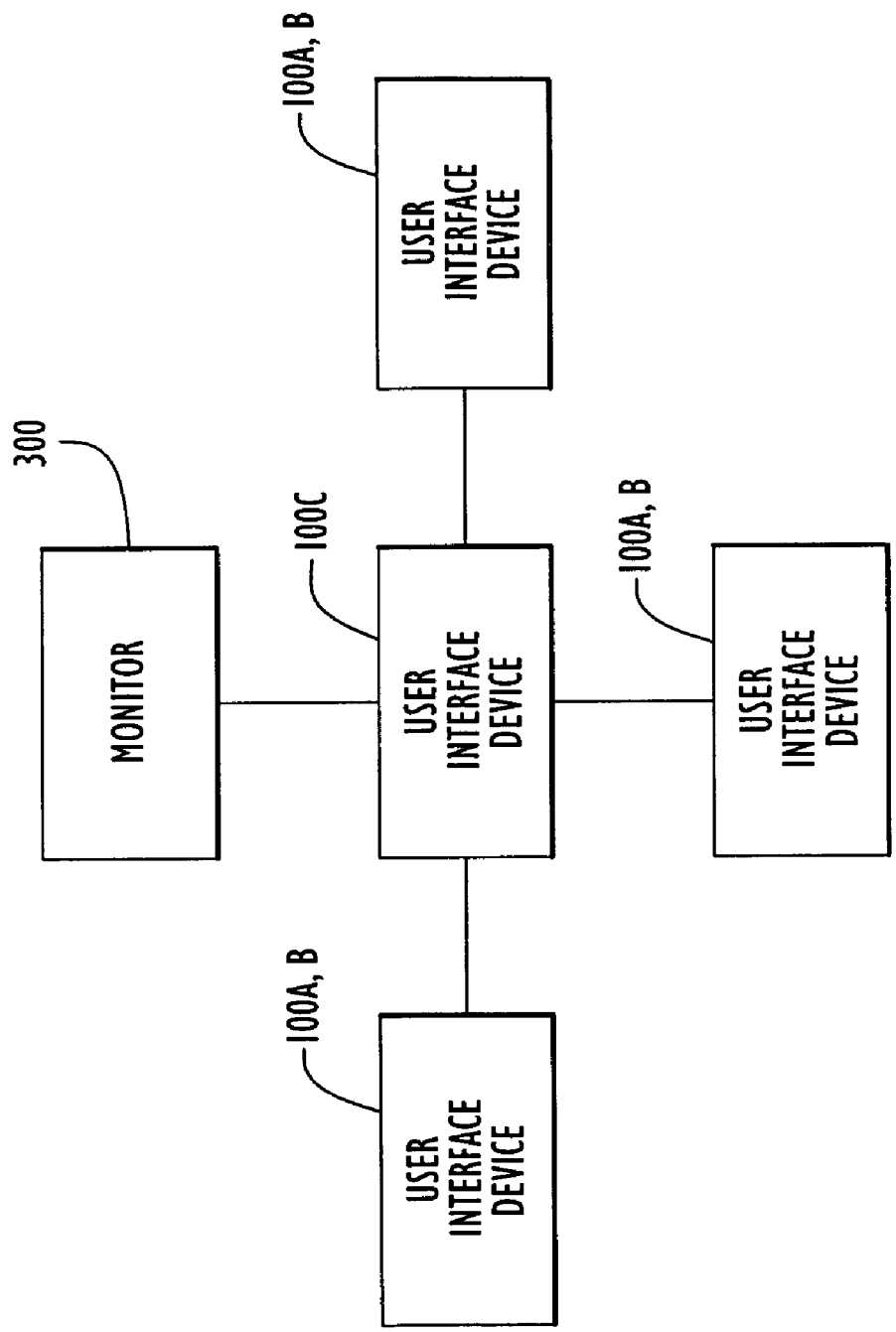
FIG. 9 is a diagrammatic illustration of a series of physically demanding user interface devices according to the present invention arranged in a star type network topology to facilitate video game play with a plurality of users.

Alternatively, the network may be configured in a star type configuration as illustrated, by way of example, in FIG. 9. In particular, a plurality of user interface devices 100a, 100b are arranged with one or more user interface devices 100a, 100b connected to a common or centralized user interface device 100c via communication ports 54 (FIG. 7A). The network configuration may include any quantity of user interface devices 100a, 100b, while the connections may be accomplished via a cable or a wireless connection (e.g., Bluetooth, etc.). Interface device 100c is substantially similar to user interface devices 100a, 100b and includes a sufficient quantity of communication ports 54 to accommodate communications with the other interface devices. The common user interface device is coupled to monitor 300 to display the game scenario. Processor 52 of user interface devices 100a, 100b provides information indicating desired actions of a user (e.g., manipulation of joystick 106 and/or other input mechanisms, etc.) to corresponding communication ports 54 of that user interface device for transmission to central user interface device 100c. The processor of the common user interface device is coupled to communication ports 54 and receives information from the other user interface devices, preferably indicating desired actions from other users (e.g., manipulation of joystick 106 and/or other input devices, etc.). Processor 52 of the common user interface device processes the received information to update the game scenario in accordance with the user actions for display on monitor 300. In other words, processor 52 of the common interface device detects the additional interface devices and configures the game application to display the appropriate quantity of users on monitor 300.

It will be appreciated that the embodiments described above and illustrated in the drawings represent only a few of the many ways of implementing a method and apparatus for operatively controlling a virtual reality scenario with a physically demanding interface.

Interface device 100a and the corresponding components (e.g., rod, base, joystick, etc.) may be of any size or shape, may be arranged in any fashion and may be constructed of any suitable materials. The base may be of any size or shape, and include any quantity of recessed or other portions of any size or shape defined in the base at any suitable locations to support a user. The base may be constructed of any suitable materials and may support any desired user body portions (e.g., legs, arms, torso, etc.), where the user may utilize the device in any suitable position (e.g., sitting down, standing, lying down, etc.). The base may include any quantity of any types of input devices (e.g., buttons, joysticks, etc.) disposed at any locations for any desired functions (e.g., game functions, selection, resistance controls, switch controls, etc.), where the input devices may be actuated by any suitable user body portions (e.g., hands, arms, legs, feet, etc.). The dial may be of any quantity, size or shape, may be disposed at any location and may be manipulated in any fashion to indicate a desired resistance setting. The base may further include any quantity of ports (e.g., audio, visual, communication, etc.) disposed at any suitable locations. The interface device may be coupled directly to a monitor via any conventional or other cable or connectors (e.g., RF, RCA type, etc.).

Interface device 100b and the corresponding components (e.g., rod, base, joystick, etc.) may be of any size or shape, may be arranged in any fashion and may be constructed of any suitable materials. The base may be of any size or shape, may be constructed of any suitable materials and may support any desired user body portions (e.g., legs, arms, torso, etc.), where the user may utilize the device in any suitable position (e.g., sitting down, standing, lying down, etc.). The base may include any quantity of any types of input devices (e.g., buttons, joysticks, etc.) disposed at any locations for any desired functions (e.g., game functions, selection, resistance controls, switch controls, etc.), where the input devices may be actuated by any suitable user body portions (e.g., hands, arms, legs, feet, etc.). The dial may be of any quantity, size or shape, may be disposed at any location and may be manipulated in any fashion to indicate a desired resistance setting. The base may further include any quantity of ports (e.g., audio, visual, communication, etc.) disposed at any suitable locations. The interface device may be coupled directly to a monitor via any conventional or other cable or connectors (e.g., RF, RCA type, etc.).

Interface device 100a, 100b may be utilized on any suitable surface (e.g., floor, couch, bed, etc.) and may be adjustable in any fashion (e.g., any dimension, joystick height, etc.) via any types of arrangements of components (e.g., telescoping arrangement, overlapping arrangement, extender components, etc.) to accommodate user physical characteristics.

Joystick 106 of interface device 100a, 100b may be of any size or shape, may be constructed of any suitable materials and may be disposed at any locations on the interface device. The rod may be of any size or shape, may be constructed of any suitable materials and may be disposed at any locations on the interface device. The knob may be of any size or shape, may be constructed of any suitable materials and may be disposed at any locations on the rod. The rod and/or knob may include any quantity of any types of input devices (e.g., buttons, joysticks, etc.) disposed at any locations for any desired functions (e.g., game functions, selection, resistance controls, switch controls, etc.), where the input devices may be actuated by any suitable user body portions (e.g., hands, arms, legs, feet, etc.). The joystick is preferably constructed of any lightweight or other materials (e.g., plastic, rubber, foam, padded material, etc.) to prevent injury to a user (e.g., producing forces of approximately 20 to 120 foot pounds, etc.).

The joystick of the interface device may have any suitable geometric configurations, and two or more joysticks may be combined in any suitable manner to yield a device that conforms to a desired design for a user for a particular application. The joystick may be positioned at any desired orientation or angle (e.g., the joystick may be adjustable to any desired angle by a user, etc.). The user may manipulate any portion of the joystick to interact with a game or other application (e.g., rod, knob, sleeve, etc.). The joystick of the interface device may be permanently or removably attached to the base at any desired location via any conventional or other suitable arrangements (e.g., integral unit, ball and socket, universal or other joint, sleeve arrangement, axle, spindle, etc.). The ball and socket may be of any quantity, size or shape and may couple the joystick to the base at any desired location. The universal joint may be implemented by any quantity of any conventional or other coupling mechanism (e.g., joints, gimbals, etc.), may couple the joystick to the base at any desired location and may enable joystick manipulation in any desired directions (e.g., any degrees of freedom, rotation, etc.). The universal joint and corresponding components (e.g., rod and base pivot members, legs, platforms, cross member, etc.) may be of any quantity, shape or size, may be constructed of any suitable materials and may be arranged in any fashion. The sleeve arrangement may include any quantity of sleeves of any shape or size, arranged in any fashion (e.g., nested portions, etc.) and constructed of any suitable materials. Any quantity of sleeves may be nested. The stub may be of any quantity, shape or size, may be disposed at any suitable location on the base and may be constructed of any suitable materials.

The joystick of the integral unit and stub of the sleeve arrangement are constructed of any suitable materials subject to a measurable deflection within an elastic limit of the corresponding materials when subjected to one or more straining or other forces applied by the user. Any suitable number of any types of sensors (e.g., strain gauges, etc.) may be applied to the joystick of the integral unit and stub to facilitate the measurement of any one or more types of strain or other forces applied by the user (e.g., bending forces, twisting forces, compression forces and/or tension forces) to the joystick.

The sensors (e.g., camera/photodetector, potentiometers, strain gauges, switches, damper sensors, base sensors, etc.) may be constructed of any suitable materials, may be disposed at any locations on the joystick and/or base and may be implemented by any conventional or other sensing devices (e.g., strain gauges, accelerometers, potentiometers, camera, CCD device, photodetector, etc.). Further, the sensors may include any electrical, mechanical or chemical properties that vary in a measurable manner in response to applied force to measure force applied to an object. The sensors may include any desired arrangement.

The camera or photodetector may be implemented by any quantity of any conventional or other image capturing device or light or other energy media sensing device (e.g., camera, CCD device, photodetector, etc.), and may be disposed at any suitable locations within or on the interface device (e.g., base, rod, knob, stub, etc.). The color patterns may be of any quantity, may include any suitable colors or arrangements that may be identified within a captured image, and may be disposed at any suitable locations within or on the interface device (e.g., base, rod, knob, stub, etc.). The active illuminating devices may be implemented by any quantity of any conventional or other light or other energy media emitting devices (e.g., LEDs, light bulbs, etc.) that provide identifiable arrangements within a captured image, and may be disposed at any suitable locations within or on the interface device (e.g., base, rod, stub, etc.). Any type of reference image may be utilized to determine joystick manipulation. For example, the reference image may include an image of the joystick in a reference position. Alternatively, any quantity of successive captured images may be utilized and compared to determine the joystick motion.

The potentiometers may be of any quantity, may be disposed at any suitable locations on the interface device (e.g., any suitable locations on the rod, stub, ball and/or socket, base, universal joint, universal joint legs, universal joint platforms, etc.), and may be implemented by any conventional or other devices with any variable property (e.g., electrical, chemical, mechanical, resistance, capacitance, magnetic, etc.). The cables coupled to the potentiometers may be of any quantity, shape or size, and may be disposed at any suitable locations on or within the rod and/or knob in any desired arrangement.

The switches may be implemented by any quantity of any conventional or other switching devices (e.g., switches, contacts, relays, etc.) and may be disposed at any suitable locations on the interface device (e.g., any locations on the base, rod, stub, etc.). The contacts may be implemented by any quantity of any conventional or other contacts or members to actuate the switches and may be disposed at any locations on the interface device (e.g., any locations on the base, rod, stud, etc.). The switches may be actuated without use of the contacts and may be arranged in any desired fashion to indicate joystick motion. For example, the switches may be implemented by limit switches that are disposed at corresponding locations on the base to measure the North (N), South (S), East (E) and West (W) motion of the joystick. Additional switches may be utilized at corresponding locations to measure Northwest (NW), Northeast (NE), Southwest (SW) and Southeast (SE) motion of the joystick, thereby enabling measurement in eight possible directions.

The damper mechanisms may be implemented by any quantity of conventional or other damping devices or mechanisms (e.g., dampers, elastic members, shock absorbers, etc.) and may be disposed on the interface device at any location (e.g., any location on the base, rod, stub, etc.) and arranged in any fashion. The damper mechanism may include any suitable resistance mechanism (e.g., spring, elastic device, fluid, etc.) to provide resistance for the piston. The damper mechanisms and corresponding components (e.g., cylinder, piston, piston head, piston rod, etc.) may be of any quantity, shape or size, may be constructed of any suitable materials, may be coupled to any interface device components (e.g., joystick, rod, base, etc.) and may be arranged in any fashion. The sensing device of the damper mechanisms may be implemented by any quantity of any conventional or other sensors (e.g., encoders, potentiometers, etc.), may be disposed at any locations and may be coupled to any damper mechanism components to measure joystick motion.

The sensors mounted within the base to measure base forces may be implemented by any quantity of any conventional or other sensing devices (e.g., limit switches, load cells, etc.) and may be disposed at any suitable location on or within the base to measure any suitable forces indicating joystick motion (e.g., the amount of tilting forces applied to the base, etc.).

The interface device may include any quantity of any types of input devices (e.g., buttons, slides, joysticks, track type balls, etc.) disposed at any locations and arranged in any fashion. The input devices may be of any shape or size and be actuated by any suitable user body portions (e.g., hands, arms, legs, feet, etc.). The interface device may include any quantity of any types of signal source devices to generate signals in accordance with input device manipulation (e.g., variable resistors or potentiometers, switches, contacts, relays, sensors, strain gauges, etc.). The signal sources may correspond with any quantity of axes for an input device. The input devices may be assigned to any suitable game functions.

The joystick and/or other input mechanisms may be assigned the gaming functions of any desired input devices. The switching device may be implemented by any quantity of any conventional or other devices capable of switching signals (e.g., switches, multiplexers, cross-bar switch, analog switches, digital switches, routers, logic, gate arrays, logic arrays, processor, etc.). The switch controls may include a control processor to control the switching device in accordance with the controls to achieve the desired function assignment. The switch controls may be implemented by any conventional or other control or input devices (e.g., processor, slides, switches, buttons, etc.) to provide control signals to the switching device, control processor or interface device processor. The switching device or switch controls may alternatively provide a user interface to enable the user to enter information to configure the interface device in the desired manner. The interface may be in the form of screens on a display or lights or other indicators. Further, the interface may be shown on the gaming system display and implemented by the game processor of the gaming system. The control processor may be implemented by any conventional or other processor or circuitry (e.g., microprocessor, controller, etc.). The switching device may direct signals from any quantity of inputs to any quantity of outputs in accordance with user-specified or other controls and may map any input devices and/or mechanisms to any suitable game functions. The switching device may be disposed internal or external of the interface device.

The game processor may be implemented by any quantity of any personal or other type of computer or processing system (e.g., IBM-compatible, Apple, Macintosh, laptop, palm pilot, microprocessor, gaming consoles such as the XBOX system from Microsoft Corporation, the PLAY STATION 2 system from Sony Corporation, the GAMECUBE system from Nintendo of America, Inc., etc.). The game processor may be a dedicated processor or a general purpose computer system (e.g., personal computer, etc.) with any commercially available operating system (e.g., Windows, OS/2, Unix, Linux, etc.) and/or commercially available and/or custom software (e.g., communications software, application software, etc.) and any types of input devices (e.g., keyboard, mouse, microphone, etc.). The game processor may execute software from a recorded medium (e.g., hard disk, memory device, CD, DVD or other disks, etc.) or from a network or other connection (e.g., from the Internet or other network).

The interface device may arrange data representing force measurements by sensors and other information into any suitable data packet format that is recognizable by the game processor or host computer system receiving data packets from the interface device. The data packets may be of any desired length, include any desired information and be arranged in any desired format. Any suitable number of any type of conventional or other displays may be connected to the interface device or game processor to provide any type of information relating to a particular session. A display may be located at any suitable location on or remote from the interface device.

The processors (e.g., control, game, switching device, processor 52, 62, etc.) may be implemented by any quantity of any type of microprocessor, processing system or other circuitry, while the control circuitry may be disposed at any suitable locations on and/or within the interface device, or alternatively, remote from the interface device. Processor 52 may include and execute any desired gaming or other virtual reality applications. The A/V module may be implemented by any quantity of any conventional or other processing system or circuitry (e.g., video processor, digital signal processor (DSP), etc.) providing audio and/or video signals. The interface device may be configured to include the functions of processor 52, 62, where a user can selectively couple the interface device to either a monitor or a game processor via the appropriate cable (e.g., cable 220 or 270) or other connection. In this case, the interface device may include input devices to enable a user to indicate the manner of use.

The control circuitry may be connected to one or more game processors or host computer systems via any suitable peripheral, communications media or other port of those systems. The interface device processor may further arrange digital data (e.g., force or other measurements by sensors, information, etc.) into any suitable data packet format that is recognizable by the game processor or host computer system receiving data packets from the interface device. The data packets may be of any desired length, include any desired information and be arranged in any desired format.

The interface device processor may sample the information at any desired sampling rate (e.g., seconds, milliseconds, microseconds, etc.), or receive measurement values or other information in response to interrupts. The analog values may be converted to a digital value having any desired quantity of bits or resolution. The processors (e.g., control, processor 52, 62, etc.) may process raw digital values in any desired fashion to produce information for transference to the display, game processor or host computer system. This information is typically dependent upon a particular application. The correlation between the measured force or joystick motion and provided value for that force or motion may be determined in any desired fashion.

Any suitable number of any types of conventional or other circuitry may be utilized to implement the control circuitry, amplifier, switching device and processors (e.g., control, processor 52, 62, etc.). The amplifier may produce an amplified value in any desired voltage range, while the A/D conversion may produce a digitized value having any desired resolution or quantity of bits (e.g., signed or unsigned). The control circuitry may include any quantity of the above or other components arranged in any fashion. The resistance change of the sensors may be determined in any manner via any suitable conventional or other circuitry. The amplifiers and processor 52, 62 may be separate within a circuit or integrated as a single unit. Any suitable number of any type of conventional or other displays may be connected to the interface device, where processors 52, 62 may provide any type of information relating to a particular computer interactive session (e.g., force and work, calories burned, etc.). A display may be located at any suitable location on or remote from the interface device.

The control circuitry may be connected to one or more game processors of video gaming or host computer systems via any suitable peripheral, communications media or other port of those systems. Any suitable number and types of wired and/or wireless devices may be provided to facilitate communications between the interface device and video game processors. For example, any suitable number of cables can be provided and configured for connection with each other, with each cable including one or more suitable wiring sets with one or more wires, to facilitate connection with two or more video game processors. The cable junctions of the cable system and extension cable device may transfer signals between the wires within the cable and wiring sets in any fashion (e.g., direct connection of wires, connection to a terminal, etc.). The wiring of the cable may be connected to any quantity of wiring sets, where the cable wiring may utilize one or more wires to transfer gaming signals common to any quantity of wiring set wires to reduce the quantity of wires employed in the cable. Alternatively, the cable may include a dedicated wire for each wiring set wire. Any suitable number and types of housings or other structures may be connected with one or more cables to facilitate transfer of signals between wiring extending within a cable and wiring sets for transfer into separate cables. Any suitable number and types of connectors (e.g., male and/or female connection plugs) may be provided to facilitate connection and a communication link between an interface device and one or more different video game processors. The cable system and extension cable device may include cables of any suitable lengths. The wake-up signal may include any signal or desired information to identify a game processor (e.g., voltage or current level, game processor identifier, etc.).

Any suitable number and types of wireless communication links (e.g., transmitters, receivers and/or transceivers) that send and/or receive any suitable types of signals (e.g., RF and/or IR) can be provided for connection between an interface device and/or one or more video game processors. One or more interface device processors may be connected with one or more wireless communication links to facilitate communications between an interface device and one or more video game processors. In addition, one or more processors may be provided within a communication device (e.g., a transceiver), connection plugs and/or other connecting structure that connects with one or more video game processors, where these processors are configured to identify video game processors to which they are connected and provide appropriate data transmissions.

Further, a universal adaptor may be provided that is generic and configured to connect with any selected types of video game processors, where the universal adaptor includes one or more suitable processors to identify a specific video game processor and to effectively convert data transmissions for recognition by each of the interface device and the specific video game processor that is connected to the interface device via the universal adaptor. The universal adaptor may include one or more cables to sheath one or more sets of wiring and/or one or more suitable wireless communication devices (e.g., transmitters, receivers and/or transceivers, etc.) to facilitate wireless communications.

The resistance level for the joystick may be controlled by adjusting amplifier or other parameters. Alternatively, the resistance level may be controlled based on thresholds entered by a user. For example, the interface device processor may be configured to require a threshold resistance level be achieved, which is proportionate to the amount of straining force applied by the user to the joystick. Threshold values for the change in resistance may be input to the processor by the user via an appropriate input device (e.g., a keypad). In addition, the interface device processor may apply weights to the measurements to alter the user resistance level. The weights may include any desired values and be determined in any fashion based on entered information from the user.

Any quantity of interface devices may be networked in any fashion (e.g., local, remote, any network topology, etc.) to transfer information to enable plural users to engage in a game or other virtual reality activity. The networked interface devices may transfer information in a daisy chain fashion (e.g., a ring topology) or utilize a central interface device to process information for display (e.g., a star topology). The networked interface devices may be local (e.g., communications via a local network, wired or wireless connections, etc.) or remote from each other (e.g., communications via a WAN or the Internet). The interface devices may include any quantity of communication ports and may communicate via any suitable interface or protocol (e.g., serial or USB, Bluetooth, etc.).

It is to be understood that the software of the processors (e.g., control, processor 52, 62, game, switching device, etc.) may be implemented in any desired computer language, and could be developed by one of ordinary skill in the computer and/or programming arts based on the functional description contained herein. Further, any references herein of software performing various functions generally refer to computer systems or processors performing those functions under software control. The processors (e.g., control, processor 52, 62, game, switching device, etc.) may alternatively be implemented by hardware or other processing circuitry, or may be implemented on the game processor or host system as software and/or hardware modules receiving the sensor and/or input device information or signals. The various functions of the processors (e.g., control, game, switching device, processor 52, 62, etc.) may be distributed in any manner among any quantity (e.g., one or more) of hardware and/or software modules or units, processors, computer or processing systems or circuitry, where the processors, computer or processing systems or circuitry may be disposed locally or remotely of each other and communicate via any suitable communications medium (e.g., LAN, WAN, Intranet, Internet, hardwire, modem connection, wireless, etc.). The software and/or algorithms described above may be modified in any manner that accomplishes the functions described herein.

The terms "upward", "downward", "top", "bottom", "side", "front", "rear", "upper", "lower", "vertical", "horizontal", "height", "width", "length", "forward, "backward", "left", "right" and the like are used herein merely to describe points of reference and do not limit the present invention to any specific orientation or configuration.

The present invention interface device is not limited to the gaming applications described above, but may be utilized as a peripheral for any processing system, software or application.

From the foregoing description, it will be appreciated that the invention makes available a novel a method and apparatus for operatively controlling a virtual reality scenario with a physically demanding interface, wherein a user interface device requires a user to perform a physically demanding activity or provide physical exertion to interact with a game scenario or computer simulations.

Having described preferred embodiments of a new and improved method and apparatus for operatively controlling a virtual reality scenario with a physically demanding interface, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A user interface device enabling a user to perform a physically demanding activity to manipulate a virtual reality scenario comprising:
   a base in the form of a platform and including a top surface to directly support a user thereon;
   an elongated rod attached to said base via a sleeve arrangement and manipulable by said user to control said virtual reality scenario, wherein said sleeve arrangement includes a stub disposed on said base and at least one sleeve disposed over said stub and receiving said elongated rod therein, and wherein the quantity and elasticity of said at least one sleeve controls an amount of user force required to manipulate said elongated rod; and a sensing unit to measure manipulation of said elongated rod by said user;

wherein said base includes a processor coupled to said sensing unit to process data relating to said measured manipulation to facilitate control of said virtual reality scenario in accordance with said manipulation of said elongated rod by said user.

2. The device of claim 1, wherein an upper portion of said elongated rod includes a knob with an input device disposed on a knob top surface to enter information to control said virtual reality scenario.

3. The device of claim 1 further including a reset button to reset said user interface device.

4. The device of claim 1 further including:
resistance controls to selectively adjust an amount of user force required to manipulate said elongated rod to control said virtual reality scenario.

5. The device of claim 1, wherein said base top surface includes a recessed portion to contour a user body portion in a seated position.

6. The device of claim 1, wherein said base accommodates a user in a standing position and further includes at least one input device disposed on a base top surface and actuable by user feet to enter information to control said virtual reality scenario.

7. The device of claim 1, wherein said processor generates said virtual reality scenario and controls that scenario in accordance with said manipulation of said elongated rod by said user.

8. The device of claim 7, wherein said user interface device is directly coupled to a monitor to display said generated virtual reality scenario.

9. The device of claim 1, wherein said processor transfers information including said processed data to a host processing system generating said virtual reality scenario to control that scenario in accordance with said manipulation of said elongated rod by said user.

10. The device of claim 9 further including:
a cable with a plurality of connectors, wherein at least two connectors are configured to couple said user interface device to different host processing systems.

11. The device of claim 1, wherein said elongated rod is constructed of at least one of plastic, rubber, foam and a padded material to prevent injury to a user during manipulation of said elongated rod.

12. The device of claim 1, wherein said elongated rod is lightweight to enable said elongated rod to produce forces at or below approximately seventy foot pounds to prevent injury during manipulation by said user.

13. The device of claim 1, wherein said sensing unit includes:
at least one strain gauge each to measure strain applied to said elongated rod along a corresponding axis to determine manipulation of said elongated rod.

14. The device of claim 1, wherein said sensing unit includes:
a plurality of switches disposed at particular locations and selectively actuable in response to manipulation of said elongated rod, wherein said locations of actuated switches indicate said manipulation of said elongated rod.

15. The device of claim 1, wherein said virtual reality scenario includes a video game scenario.

16. The device of claim 1, wherein said elongated rod is removably attached to said base.

17. A user interface device enabling a user to perform a physically demanding activity to manipulate a virtual reality scenario comprising:
a base in the form of a platform and including a top surface to directly support a user thereon;

an elongated rod attached to said base and manipulable by said user to control said virtual reality scenario; and a sensing unit to measure manipulation of said elongated rod by said user, wherein said sensing unit includes:
at least one identifier disposed on said elongated rod; and
an image capture device to produce images including said elongated rod;

wherein said base includes a processor coupled to said sensing unit to process data relating to said measured manipulation to facilitate control of said virtual reality scenario in accordance with said manipulation of said elongated rod by said user, and wherein said processor processes said images to determine displacement of said at least one identifier within said images to determine manipulation of said elongated rod.

18. The device of claim 17, wherein an upper portion of said elongated rod includes a knob with an input device disposed on a knob top surface to enter information to control said virtual reality scenario.

19. The device of claim 17 further including a reset button to reset said user interface device.

20. The device of claim 17 further including:
resistance controls to selectively adjust an amount of user force required to manipulate said elongated rod to control said virtual reality scenario.

21. The device of claim 17, wherein said base top surface includes a recessed portion to contour a user body portion in a seated position.

22. The device of claim 17, wherein said base accommodates a user in a standing position and further includes at least one input device disposed on a base top surface and actuable by user feet to enter information to control said virtual reality scenario.

23. The device of claim 17, wherein said processor generates said virtual reality scenario and controls that scenario in accordance with said manipulation of said elongated rod by said user.

24. The device of claim 23, wherein said user interface device is directly coupled to a monitor to display said generated virtual reality scenario.

25. The device of claim 17, wherein said processor transfers information including said processed data to a host processing system generating said virtual reality scenario to control that scenario in accordance with said manipulation of said elongated rod by said user.

26. The device of claim 25 further including:
a cable with a plurality of connectors, wherein at least two connectors are configured to couple said user interface device to different host processing systems.

27. The device of claim 17, wherein said elongated rod is constructed of at least one of plastic, rubber, foam and a padded material to prevent injury to a user during manipulation of said elongated rod.

28. The device of claim 17, wherein said elongated rod is lightweight to enable said elongated rod to produce forces at or below approximately seventy foot pounds to prevent injury during manipulation by said user.

29. The device of claim 17, wherein said virtual reality scenario includes a video game scenario.

30. The device of claim 17, wherein said elongated rod is removably attached to said base.

31. A user interface device enabling a user to perform a physically demanding activity to manipulate a virtual reality scenario comprising:
a base in the form of a platform and including a top surface to directly support a user thereon;
an elongated rod attached to said base and manipulable by said user to control said virtual reality scenario; and
a sensing unit to measure manipulation of said elongated rod by said user, wherein said sensing unit includes a plurality of damper units coupled to said elongated rod and said base to dampen elongated rod motion, wherein each damper unit includes a sensing device to measure damper unit operation in response to manipulation of said elongated rod to measure that manipulation;
wherein said base includes a processor coupled to said sensing unit to process data relating to said measured manipulation to facilitate control of said virtual reality scenario in accordance with said manipulation of said elongated rod by said user.

32. The device of claim 31, wherein an upper portion of said elongated rod includes a knob with an input device disposed on a knob top surface to enter information to control said virtual reality scenario.

33. The device of claim 31 further including a reset button to reset said user interface device.

34. The device of claim 31 further including:
resistance controls to selectively adjust an amount of user force required to manipulate said elongated rod to control said virtual reality scenario.

35. The device of claim 31, wherein said base top surface includes a recessed portion to contour a user body portion in a seated position.

36. The device of claim 31, wherein said base accommodates a user in a standing position and further includes at least one input device disposed on a base top surface and actuable by user feet to enter information to control said virtual reality scenario.

37. The device of claim 31, wherein said processor generates said virtual reality scenario and controls that scenario in accordance with said manipulation of said elongated rod by said user.

38. The device of claim 37, wherein said user interface device is directly coupled to a monitor to display said generated virtual reality scenario.

39. The device of claim 31, wherein said processor transfers information including said processed data to a host processing system generating said virtual reality scenario to control that scenario in accordance with said manipulation of said elongated rod by said user.

40. The device of claim 39 further including:
a cable with a plurality of connectors, wherein at least two connectors are configured to couple said user interface device to different host processing systems.

41. The device of claim 31, wherein said elongated rod is constructed of at least one of plastic, rubber, foam and a padded material to prevent injury to a user during manipulation of said elongated rod.

42. The device of claim 31, wherein said elongated rod is lightweight to enable said elongated rod to produce forces at or below approximately seventy foot pounds to prevent injury during manipulation by said user.

43. The device of claim 31, wherein said virtual reality scenario includes a video game scenario.

44. The device of claim 31, wherein said elongated rod is removably attached to said base.

* * * * *